(12) United States Patent
Yang et al.

(10) Patent No.: US 12,196,976 B2
(45) Date of Patent: Jan. 14, 2025

(54) MULTI-DIRECTIONAL GRATINGS IN A WAVEGUIDE SYSTEM

(71) Applicant: Meta Platforms Technologies, LLC, Menlo Park, CA (US)

(72) Inventors: Yang Yang, Redmond, WA (US); Jianbo Zhao, Redmond, WA (US); Peter Johnsen, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 178 days.

(21) Appl. No.: 17/850,663

(22) Filed: Jun. 27, 2022

(65) Prior Publication Data

US 2023/0204967 A1 Jun. 29, 2023

Related U.S. Application Data

(60) Provisional application No. 63/294,343, filed on Dec. 28, 2021.

(51) Int. Cl.
*G02B 27/01* (2006.01)
*G02B 6/42* (2006.01)

(52) U.S. Cl.
CPC .......... *G02B 27/0179* (2013.01); *G02B 6/42* (2013.01); *G02B 6/4214* (2013.01); *G02B 27/0172* (2013.01); *G02B 2027/0174* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| 9,759,913 B2 | 9/2017 | Saarikko et al. |
| 2016/0085300 A1* | 3/2016 | Robbins ................. G06F 3/013 345/633 |
| 2019/0041634 A1 | 2/2019 | Popovich et al. |
| 2020/0312040 A1 | 10/2020 | Schowengerdt et al. |
| 2022/0011578 A1 | 1/2022 | Sinay et al. |

OTHER PUBLICATIONS

International Search Report and Written Opinion for International Application No. PCT/US2022/054035, mailed Apr. 5, 2023, 9 pages.
Final Office Action mailed Apr. 29, 2024 for U.S. Appl. No. 18/121,402, filed Mar. 14, 2023, 19 pages.
Non-Final Office Action mailed Nov. 28, 2023 for U.S. Appl. No. 18/121,402, filed Mar. 14, 2023, 14 pages.
Non-Final Office Action mailed Sep. 9, 2024 for U.S. Appl. No. 18/121,402, filed Mar. 14, 2023, 18 pages.

* cited by examiner

*Primary Examiner* — Jerry Rahll
(74) *Attorney, Agent, or Firm* — Freestone Intellectual Property Law PLLC; Aaron J. Visbeek

(57) ABSTRACT

An apparatus, system, and method for a waveguide system may be used to support eye tracking in a head mounted display (HMD). The waveguide system may be positioned in a user's field of view and within a lens assembly of the HMD to capture light that is reflected from an eye. The waveguide system may have a number of multi-directional gratings configured to direct light to an out-coupling grating. The multi-directional gratings include first and second in-coupling diffraction gratings disposed in a waveguide. The first and second in-coupling diffraction gratings are oriented to direct incident light in multiple directions within the waveguide towards the out-coupling diffraction grating.

19 Claims, 16 Drawing Sheets

MULTI-DIRECTIONAL GRATINGS IN A WAVEGUIDE SYSTEM

CROSS-REFERENCE TO RELATED APPLICATIONS

This application claims priority to U.S. Provisional Application No. 63/294,343 filed Dec. 28, 2021, which is hereby incorporated by reference.

TECHNICAL FIELD

This disclosure generally relates to optics, and in particular to eye tracking technologies.

BACKGROUND INFORMATION

Eye tracking technology enables head mounted displays (HMDs) to interact with users based on the users' eye movement or eye orientation. Existing eye tracking systems can be technically limited by natural obstructions. For example, eyelashes and eyelids can obstruct images taken of an eye, which may decrease the quality of eye tracking operations.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
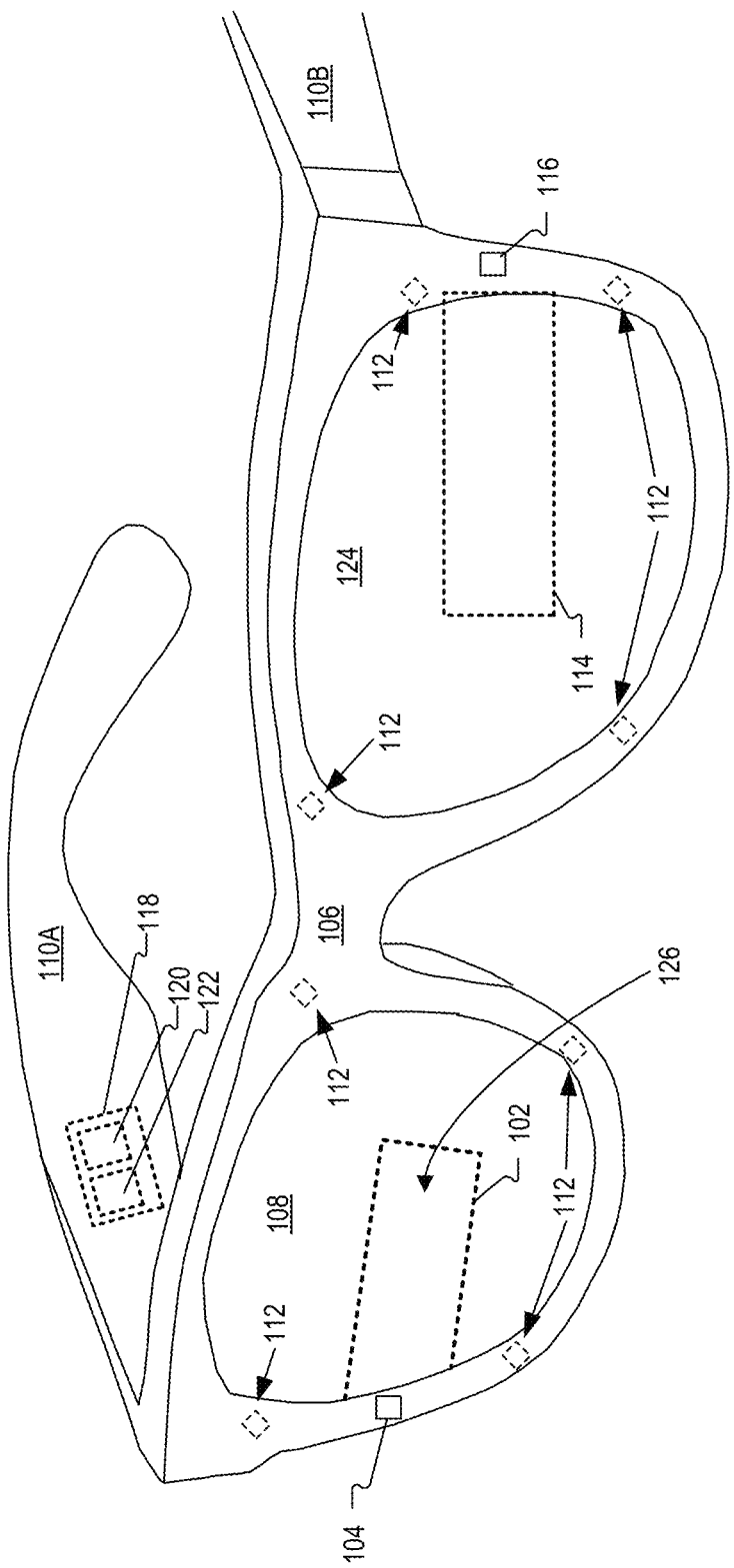
FIG. 1 illustrates a head mounted display, in accordance with aspects of the disclosure.

Embodiments of multi-directional gratings in a waveguide system to support in-field eye tracking are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm to 700 nm. Non-visible light may be defined as light having wavelengths that are outside the visible light range, such as ultraviolet light and infrared light. In aspects of this disclosure, red light may be defined as having a wavelength range of approximately 620 to 750 nm, green light may be defined as having a wavelength range of approximately 495 to 570 nm, and blue light may be defined as having a wavelength range of approximately 450 to 495 nm.

As used herein, the angle of diffraction of light from an optical element (e.g., an optical coupler, a diffraction grating, holographic optical element, etc.) is an angle of displacement of an exit ray with reference to the normal (i.e., 90 degrees) of the exit surface of the optical element.

As used herein, a diffraction grating may include a ruled grating or a holographic grating. A holographic grating may include a substrate with a photosensitive material onto which gratings are recorded (e.g., internal to the substrate). A holographic grating may also be referred to as a holographic optical element (HOE). A diffraction grating may also be referred to as a patch, so embodiments of the disclose may include a multi-patch waveguide system for eye tracking.

Eye tracking functionality expands the services and quality of interaction that head mounted displays (HMDs) can provide to users. Eyelashes and eyelids can block and inhibit the quality of signal (e.g., image) available from an eye when imaging is performed from a periphery of an eye. A significantly better position for imaging light reflections from an eye is from directly in front of the eye. However, placing a camera right in front of an eye could obstruct the vision of a user and could be an annoyance that reduces the quality of a user's experience with the HMD. Disclosed herein are techniques for a waveguide system that captures light from an eye, from directly in front of an eye, and from in the field of vision (in-field) of the eye. The waveguide system directs light from an in-field portion of a lens assembly to an image sensor that may be positioned on or in a frame of the HMD. Additionally, the waveguide system may use multi-directional gratings to redirect light in a waveguide to an out-coupling diffraction grating, to expand the eyebox region from which reflections can be detected.

An HMD may include a waveguide system that is at least partially disposed in a lens assembly and in a frame of the HMD to receive light reflections from a user's eye. The waveguide system may direct light reflections (e.g., infrared) from a user's eye to an image sensor to enable distraction-free and in-field imaging of a user's eye. The waveguide system may include two or more (e.g., three) in-coupling diffraction gratings, a waveguide, and an out-coupling diffraction grating. The in-coupling diffraction gratings may be configured to in-couple light reflections from an eye (or eyebox region) into the waveguide. The in-coupling diffraction gratings may be configured and oriented to direct light onto a number of focal regions of an out-coupling diffraction grating. The in-coupling diffraction grating may be configured and oriented to direct the light using various directions, various light paths, various focal lengths, and various focal points. Some of the light paths may include one or more mirrors integrated or positioned in the waveguide to route light between in-coupling and out-coupling diffraction gratings. The waveguide may direct (e.g., through total internal reflection (TIR)) the light from the in-coupling diffraction gratings to one or more out-coupling diffraction gratings. The out-coupling diffraction gratings may be configured to out-couple the light from the waveguide to one or more image sensors (e.g., through a lens).

Each of the in-coupling diffraction gratings may be a holographic optical element (HOE) having a plurality of slanted grating planes that are configured to map (or encode) an incident position of each light ray to a TIR angle, where the incident position is with respect to a surface of the in-coupling diffraction grating. In other words, the TIR angle of a particular light ray may be indicative of a position for which the light ray was received on the in-coupling diffraction grating. The out-coupling diffraction grating may then be configured to decode the incident position of each light ray based on the diffraction angle of the particular light ray. In one embodiment, the exit angle or exit position of a light ray from the out-coupling diffraction grating is proportional or is related to the incident position of the particular light ray.

A controller may be communicatively coupled to the image sensor to receive image data from the image sensor. The controller may use the image data to determine an orientation of the eye(s) and/or to perform one or more eye tracking operations. Based on eye orientations and/or eye tracking data, the HMD may be configured to selectively display information and/or provide or adjust a number of user interface elements in the lens assembly of the HMD, in accordance with aspects of the disclosure.

The in-coupling diffraction gratings and the out-coupling diffraction grating may be implemented as transmissive diffraction gratings or as reflective diffraction gratings. A transmissive diffraction grating operates in transmission on a particular wavelength of light (e.g., within the infrared range) and simply passes or transmits other wavelengths without diffraction. A reflective diffraction grating operates in reflection on a particular wavelength of light (e.g., within the infrared range) and passes or transmits other wavelengths without diffraction. The footprint, surface area, and/or volume of the in-coupling diffraction gratings may be larger than the footprint, surface area, and/or volume of the out-coupling diffraction grating to facilitate capturing light reflections from an eyebox and to facilitate focusing light onto an image sensor that is within the frame of the HMD.

The combined surface area of multiple (e.g., two) in-coupling diffraction gratings may operate to expand the effective area of the eyebox region from which light reflections may be diffracted into the waveguide.

Each of the in-coupling diffraction gratings (and/or the out-coupling diffraction grating) may be a rolled diffraction grating having a number of slanted diffraction gratings. The slanted diffraction gratings diffract light into the waveguide. The slanted diffraction gratings may diffract light with a different diffraction angle on a first side of the in-coupling diffraction grating than on a second side of the in-coupling diffraction grating. The slanted diffraction gratings may have slant angles that change (e.g., increase or decrease) from the first side of the in-coupling diffraction grating to the second side of the in-coupling diffraction, according to aspects of the disclosure. The slanted diffraction gratings may be designed or configured to operate on a particular range of wavelengths (e.g., particular near-infrared or infrared wavelengths). The slanted diffraction gratings may have slant angles, grating lines, and grating periods that are defined based on diffraction angles and the angular bandwidth of the slanted diffraction gratings, in accordance with embodiments of the disclosure.

The apparatus, system, and method for a waveguide system having multi-directional gratings described in this disclosure may enable improvements in eye tracking technologies, for example, to support operations of an HMD. These and other embodiments are described in more detail in connection with FIGS. 1-12.

FIG. 1 illustrates an example head mounted display (HMD) 100 that supports eye tracking from within the field of vision (in-field) of a user, in accordance with embodiments of the disclosure. HMD 100 includes a waveguide system 102 that is configured to in-couple light from an eyebox region and out-couple the light from the eyebox region to an image sensor 104 that is positioned in or on a frame 106, according to an embodiment. Waveguide system 102 is partially disposed within a lens assembly 108 and is partially positioned within frame 106, to support in-field reception of light reflected from an eyebox region, according to an embodiment. An advantage of in-field imaging of the eyebox region and a user's eye is that positioning waveguide system 102 in front of a user's eye reduces obstructions such as eyelids and eyelashes that may reduce the quality of images that can be captured from a user's eye. Another advantage of in-field imaging of the eyebox region may be improved reception of reflections from the user's eye, according to aspects of the disclosure. Waveguide system 102 may be used to support eye tracking, user experience (UX), and other features of HMD 100. An HMD, such as HMD 100, is one type of head mounted display, typically worn on the head of a user to provide artificial reality content to the user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

HMD 100 carries waveguide system 102 and image sensor 104 with frame 106. Frame 106 is coupled to arms 110A and 110B. Lens assembly 108 is mounted to, inserted into, or otherwise carried by frame 106. Lens assembly 108 may include a prescription optical layer matched to a particular user of HMD 100 or may be a non-prescription lens. The illustrated HMD 100 is configured to be worn on or about a head of a wearer of HMD 100.

Lens assembly 108 may appear transparent to a user to facilitate augmented reality or mixed reality and to enable a user to view scene light from the environment around her while also receiving image light directed to her eye(s). Consequently, lens assembly 108 may be considered (or include) an optical combiner. Lens assembly 108 may include two or more optical layers that carry portions of waveguide system 102, in an embodiment. In some embodiments, display light from one or more integrated displays is directed into one or both eyes of the wearer of HMD 100.

Waveguide system 102 and image sensor 104 can be configured to capture images of reflections off of a user's eye, according to an embodiment. To generate reflections of light off of the user's eye, HMD 100 may include a number of light sources 112 positioned at one or more locations around frame 106. Light sources 112 are oriented to direct light towards the eyebox region, to illuminate at least one user's eyes. Light sources 112 may emit light that is in the non-visible spectrum. For example, light sources 112 are configured to emit infrared light, for example, having a wavelength in the range of 750 nm to 1500 nm, according to an embodiment. Some of light sources 112 may be configured to emit first-wavelength light that is light having a first wavelength (e.g., 1300 nm), and others of light sources 112 may be configured to emit second-wavelength light that is light of a second wavelength (e.g., 940 nm). Light sources 112 may be light emitting diodes (LEDs), vertical-cavity surface-emitting lasers (VCSELs), micro light emitting diode (micro-LED), an edge emitting LED, a superluminescent diode (SLED), or another type of light source. In one embodiment, light emitted from some of light sources 112 is infrared light centered around 850 nm. Infrared light from other sources may illuminate the eye as well. HMD 100 may be configured to use images of reflections off of a user's eyes to determine an orientation of a user's eye and/or to perform eye tracking operations, according to an embodiment.

HMD 100 includes a controller 118 communicatively coupled to image sensor 104, according to an embodiment. Controller 118 is coupled to image sensor 104 to receive images captured by image sensor 104 using waveguide system 102, according to an embodiment. Controller 118 may include processing logic 120 and one or more memories 122 to analyze image data received from image sensor 104, to determine an orientation of one or more of a user's eyes, to perform one or more eye tracking operations, and/or to display or provide user interface elements in lens assembly 108, according to an embodiment. Controller 118 may include a wired and/or wireless data interface for sending and receiving data and graphic processors, and one or more memories 122 for storing data and computer-executable instructions. Controller 118 and/or processing logic 120 may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

HMD 100 may include a waveguide system 114 and an image sensor 116 positioned on or around a lens assembly 124 that is on, for example, a left side of frame 106. Waveguide system 114 may include similar features as waveguide system 102, according to an embodiment. Image sensor 116 may be configured to operate similarly to image sensor 104 and may also be coupled to controller 118, according to an embodiment. Lens assembly 124 may include similar features and/or layers as lens assembly 108.

Waveguide system 102 may be configured to pass or transmit scene light from a scene side of HMD 100 so that waveguide system 102 appears to be transparent to a user of HMD 100. Waveguide system 102 is also configured to selectively direct light from, for example, a center region 126 of lens assembly 108 to image sensor 104, according to various aspects of the disclosure.

Figure 2:
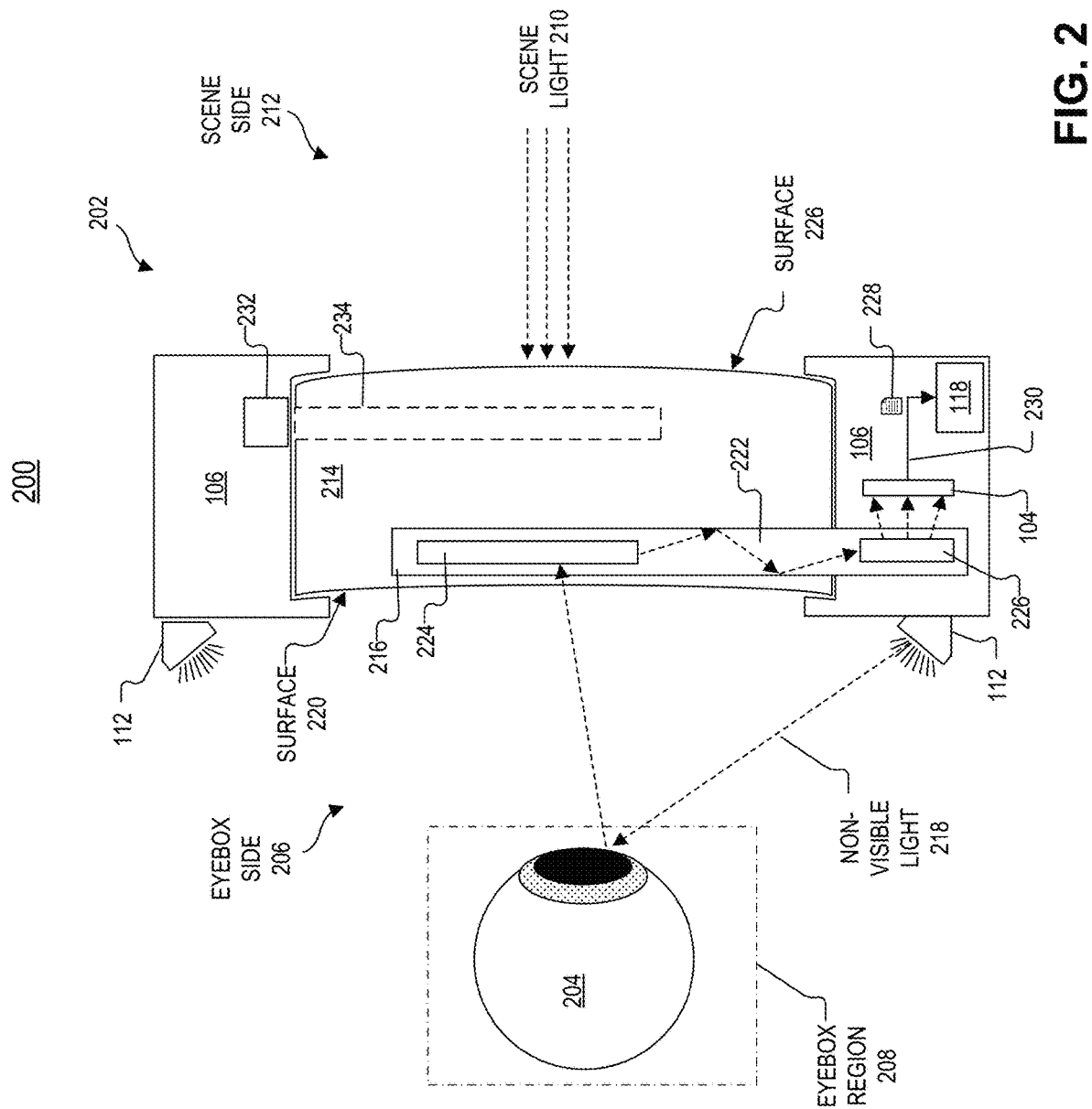
FIG. 2 illustrates an example implementation of a lens assembly for a head mounted display, in accordance with aspects of the disclosure.

FIG. 2 illustrates an example top view of an ocular environment 200, in accordance with various embodiments of the disclosure. Ocular environment 200 includes an HMD 202 and an eye 204, according to an embodiment. HMD 202 is an example implementation of HMD 100. As illustrated, HMD 202 is a partial cross-sectional view of aspects of a head mounted display, according to an embodiment. Eye 204 is positioned on an eyebox side 206 of HMD 202. Eye 204 is positioned in an eyebox region 208 on eyebox side 206 and is positioned to receive scene light 210 from a scene side 212. Scene light 210 passes through a lens assembly 214 to eyebox region 208 and to eye 204, according to an embodiment. Scene light 210 passes from scene side 212 through lens assembly 214 and through waveguide system 216 to eyebox side 206.

Waveguide system 216 is an example implementation of waveguide system 102 and/or 114, according to an embodiment. Waveguide system 216 is configured to receive reflections of non-visible light 218 that becomes incident on surface 220 from eye 204 and/or eyebox region 208, according to an embodiment. Waveguide system 216 includes a waveguide 222, an in-coupling diffraction grating 224, and an out-coupling diffraction grating 226, according to an embodiment.

Waveguide system 216 is configured to receive reflections of non-visible light 218 with in-coupling diffraction grating 224, according to an embodiment. In-coupling diffraction grating 224 in-couples reflected light into waveguide 222, according to an embodiment. In-coupling diffraction grating 224 may represent two, three, or more in-coupling diffraction gratings (e.g., a first diffraction grating configured to diffract light in a first direction and a second diffraction grating configured to diffraction light in a second direction). By in-coupling the reflected light into waveguide 222, in-coupling diffraction grating 224 directs the reflected light to out-coupling diffraction grating 226, according to an embodiment. Out-coupling diffraction grating 226 receives the reflected light from in-coupling diffraction grating 224, after the reflected light has propagated from in-coupling diffraction grating 224 to out-coupling diffraction grating 226 through total internal reflection (TIR) within waveguide 222, according to an embodiment.

Out-coupling diffraction grating 226 is configured to receive the reflected light and out-couple the reflected light from waveguide 222, according to an embodiment. Out-coupling diffraction grating 226 is configured to provide the received reflected light to image sensor 104, according to an embodiment. As illustrated, out-coupling diffraction grating 226 and image sensor 104 may be positioned within (or on) a portion of frame 106 (e.g., out of the field-of-view of eye 204), according to an embodiment. Out-coupling diffraction grating 226 and a portion of waveguide 222 may be positioned within a portion of frame 106, to facilitate out-coupling of the reflected light from out-coupling diffraction grating 226 to image sensor 104, according to an embodiment. Out-coupling diffraction grating 226 may be implemented as two or more out-coupling diffraction gratings that are configured to direct light to two or more respective image sensors, according to an embodiment.

Image sensor 104 is configured to convert the received reflected light into electrical signals. The electrical signals may be representative of the reflected light received by in-coupling diffraction grating 224, according to an embodiment. Image sensor 104 converts the received reflected light into image data 228 and provides image data 228 to controller 118 through a communications channel 230, according to an embodiment. In other words, controller 118 may be communicatively coupled to receive image data 228 from image sensor 104. Controller 118 may employ one or more of a variety of techniques to determine an orientation of eye 204 and perform one or more eye tracking operations based on image data 228, according to an embodiment.

HMD 202 may include a projector 232 and a display 234 that are configured to provide information and/or user interface elements to eyebox region 208 for viewing by a user of HMD 202, according to an embodiment. Display 234 may include a liquid crystal display (LCD), an organic light emitting diode (OLED) display, micro-LED display, quantum dot display, pico-projector, or liquid crystal on silicon (LCOS) display for directing image light to a wearer of HMD 202. Projector 232 may be positioned in or on frame 106, and display 234 may be at least partially positioned within lens assembly 214, according to an embodiment. Display 234 may be transparent and may be configured to allow scene light 210 to pass through lens assembly 214 to eyebox region 208, according to an embodiment. Projector 232 and display 234 may be communicatively coupled to receive instructions and/or information from controller 118 and may be configured to project information at least partially based on an orientation of eye 204, according to an embodiment.

Lens assembly 214 is illustrated as a single optical layer for illustrative purposes. Lens assembly 214 may be implemented as a single optical layer, as illustrated, or may be implemented as two or more optical layers coupled together to include waveguide system 216 and display 234, according to an embodiment.

Figure 3:
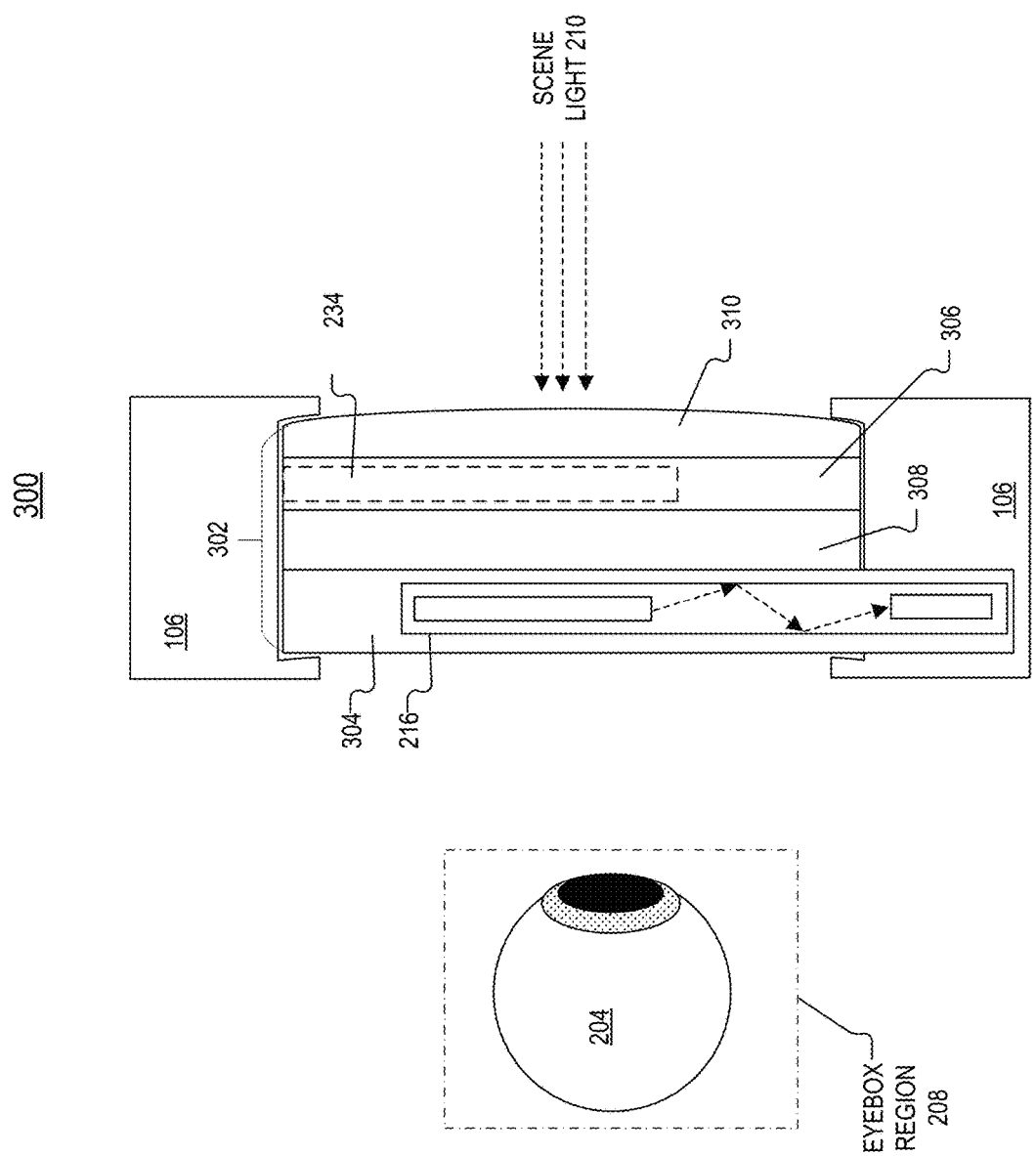
FIG. 3 illustrates an example implementation of a lens assembly, in accordance with aspects of the disclosure.

FIG. 3 illustrates a top view of an HMD 300, according to an embodiment. HMD 300 includes a lens assembly 302 that includes a number of optical layers, according to an embodiment. Lens assembly 302 is an example implementation of lens assembly 214, according to an embodiment. Lens assembly 302 includes a waveguide optical layer 304 and a display optical layer 306, according to an embodiment. Waveguide optical layer 304 is coupled to display optical layer 306 to transmit scene light 210 to eyebox region 208, according to an embodiment. Lens assembly 302 may include one or more additional layers, such as optical layer 308 and optical layer 310 to provide optical power, spacing, and one or more additional features or characteristics to support operation of HMD 300, according to an embodiment.

Figure 4A:
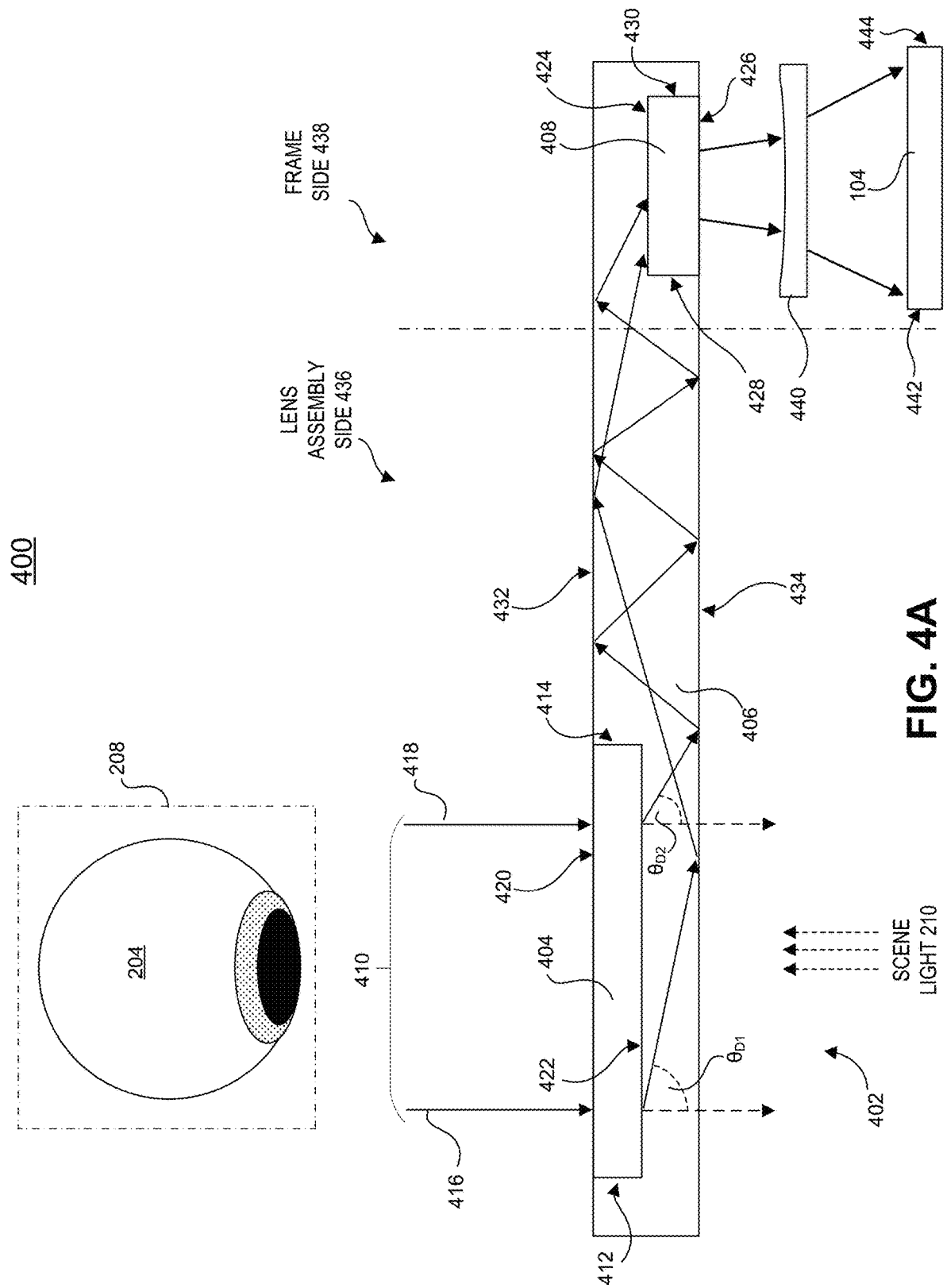
FIGS. 4A and 4B illustrate example implementations of a waveguide system that may be used in an HMD to support eye tracking operations, in accordance with aspects of the disclosure.
Figure 4B:
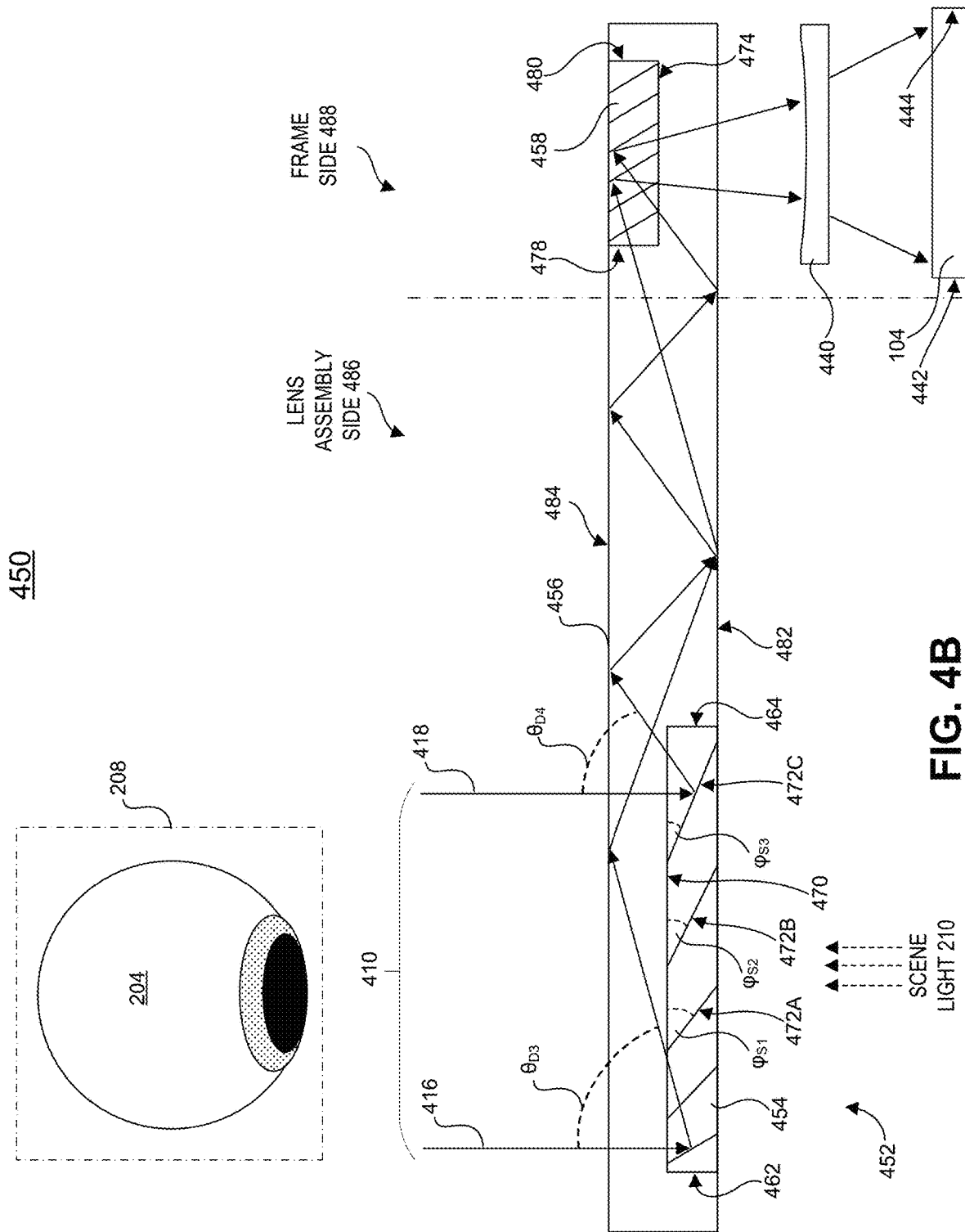

FIGS. 4A and 4B illustrate example embodiments of a waveguide imaging system that may be implemented into one or more of the disclosed HMDs, in accordance with aspects of the disclosure.

FIG. 4A illustrates a waveguide imaging system 400, according to an embodiment. Waveguide imaging system 400 includes a waveguide system 402 that is configured to receive light (e.g., reflected infrared light) from eyebox region 208 and provide the light to image sensor 104, according to an embodiment. Waveguide system 402 is an example implementation of waveguide system 102 (shown in FIG. 1) and/or waveguide system 216 (shown in FIG. 2). Waveguide system 402 uses a diffraction grating 404 to in-couple light into a waveguide 406 and uses a diffraction grating 408 to out-couple light from waveguide 406 to image sensor 104, according to an embodiment. Diffraction grating 404, waveguide 406, and diffraction grating 408 are optical elements that at least partially define waveguide system 402 and that operate together to direct light from eyebox region 208 to image sensor 104, according to an embodiment.

Diffraction grating 404 is a transmissive optical grating that is configured to operate in transmission to diffract some wavelengths of light while passing (without diffraction) other wavelengths of light. Diffraction grating 404 may be configured to diffract light having a wavelength in the infrared range of wavelengths while passing other wavelengths of light (e.g., the visible band of wavelengths) without diffraction. Diffraction grating 404 in-couples light 410 from eyebox region 208 (e.g., from eye 204) into waveguide 406 so that waveguide 406 reflects (e.g., with TIR) light 410 to diffraction grating 408.

Diffraction grating 404 includes a first end 412 and a second end 414 and is configured to diffract light rays from first end 412 differently than from second end 414, according to an embodiment. For example, diffraction grating 404 may be configured to diffract light rays 416 on first end 412 with a first diffraction angle $\theta_{D1}$ and may be configured to diffract light rays 418 on second end 414 with a second diffraction angle $\theta_{D2}$. In one embodiment, first diffraction angle $\theta_{D1}$ is a greater angle than second diffraction angle $\theta_{D2}$ so that diffraction grating 404 diffracts light 410 more aggressively from first end 412 and diffracts light 410 less aggressively from second end 414 to reduce the likelihood that light rays reflected within waveguide 406 are reflected back onto diffraction grating 404. Diffraction grating 404 is configured to diffract light at diffraction angles that progressively become smaller from first end 412 to second end 414, according to an embodiment. Alternatively, diffraction grating 404 is configured to diffract light at diffraction angles that progressively become larger from first end 412 to second end 414, according to an embodiment. Light rays 416 and 418 are representative of a large number of light rays (e.g., light 410) that are received by an entrance surface 420 and that are diffracted out of an exit surface 422 at diffraction angles that change from first end 412 to second end 414, according to various aspects of the disclosure.

Diffraction grating 408 is configured to receive light rays 416 and 418 with an entrance surface 424 and is configured to direct light rays 416 and 418 to image sensor 104. Diffraction grating 408 is a transmissive grating that is configured to operate in transmission to diffract some wavelengths of light while passing other wavelengths of light. Diffraction grating 408 is a transmissive diffraction grating that out-couples light rays 416 and 418 from waveguide 406 to image sensor 104, according to an embodiment. Diffraction grating 408 may be configured to diffractively out-couple light rays 416 and 418 from waveguide 406 to image sensor 104, according to an embodiment. Similar to diffraction grating 404, diffraction grating 408 may be configured to diffract light from exit surface 426 at a different angle from a first side 428 than from a second side 430. Diffraction grating 408 may be configured to diffract light from first side 428 at a smaller diffraction angle than from second side 430. Diffraction grating 408 may be configured to emit light at diffraction angles that gradually or progressively change from first side 428 to second side 430. The diffraction angles of emitted light rays from exit surface 426 progressively increase from first side 428 to second side 430, according to an embodiment. The diffraction angles of emitted light rays from exit surface 426 progressively decrease from first side 428 to second side 430, according to an embodiment.

Diffraction grating 404 is positioned within waveguide 406 near a surface 432 of waveguide 406 to enable diffraction grating 404 to in-couple light 410 into waveguide 406 and to enable diffraction grating 404 to direct light 410 towards diffraction grating 408, according to an embodiment. Entrance surface 420 of diffraction grating 404 defines or makes up at least part of surface 432 of waveguide 406, so that part of entrance surface 420 and surface 432 are the same surface, according to an embodiment. Diffraction grating 404 is positioned in waveguide 406 on a lens assembly side 436 of waveguide 406, according to an embodiment. Lens assembly side 436 of waveguide 406 represents a portion of waveguide 406 that transmits scene light 210 to eyebox region 208, according to an embodiment.

Diffraction grating 408 is positioned within waveguide 406 near a surface 434 of waveguide 406 to enable diffraction grating 408 to out-couple light 410 out of waveguide 406 and to enable diffraction grating 408 to direct light 410 towards image sensor 104, according to an embodiment. Exit surface 426 of diffraction grating 408 defines or makes up at least part of surface 434 of waveguide 406, so that part of exit surface 426 and surface 434 are the same surface, according to an embodiment. Diffraction grating 408 is positioned in waveguide 406 on a frame side 438 of waveguide 406, according to an embodiment. Frame side 438 of waveguide 406 represents a portion of waveguide 406 that is at least partially positioned within or on a surface of a frame of an HMD to enable out-coupling of light to image sensor 104, according to an embodiment.

Waveguide imaging system 400 may optionally include a lens 440 that is positioned between waveguide 406 and image sensor 104. Lens 440 may be constructed from a single optical layer or may include a number of optical layers coupled together to focus light from exit surface 426 onto image sensor 104. In one embodiment, diffraction grating 408 and lens 440 are configured to focus light from first end 412 of diffraction grating 404 onto a first end 442 of image sensor 104 and are configured to focus light from second end 414 of diffraction grating 404 onto a second end 444 of image sensor 104, or vice versa.

FIG. 4B illustrates a waveguide imaging system 450, according to an embodiment. Waveguide imaging system 450 includes a waveguide system 452 that is configured to receive light 410 from eyebox region 208 and selectively provide light 410 to image sensor 104, according to an embodiment. Waveguide system 452 is an example implementation of waveguide system 102 (shown in FIG. 1) and/or waveguide system 216 (shown in FIG. 2). Waveguide system 452 employs one or more reflective volume Bragg gratings (VBG) to couple light 410 to image sensor 104, according to an embodiment. By using VBGs, waveguide system 452 may advantageously operate with a reduction or elimination (e.g., below 0.01%) of visible rainbow artifacts that may occur in in-field waveguide imaging systems. More specifically, waveguide system 452 may operate with transmissive rainbow artifacts that are below 0.01% and may operate with virtually non-existent reflective rainbow artifacts, according to some implementations. In an embodiment, waveguide system 452 uses a reflective diffraction grating 454 to in-couple light into a waveguide 456 and uses a reflective diffraction grating 458 to out-couple light from waveguide 456 to image sensor 104, according to an embodiment.

Diffraction grating 454 is a reflective diffraction grating (e.g., a reflective VBG) that is configured to operate in reflection to diffract some wavelengths of light while passing (not operating on) other wavelengths of light. Diffraction grating 454 may be configured to diffract light having a wavelength (e.g., 850 nm) in the infrared range of wavelengths while passing other wavelengths of light (e.g., the visible band of wavelengths) without diffraction. Diffraction grating 454 in-couples light 410 from eyebox region 208 (e.g., from eye 204) into waveguide 456 so that waveguide 456 reflects (e.g., with TIR) light 410 to diffraction grating 458.

Diffraction grating 454 includes a first end 462 and a second end 464 and is configured to diffract light rays from first end 462 differently than light rays from second end 464, according to an embodiment. For example, diffraction grating 454 may be configured to diffract light rays 416 on first end 462 with a first diffraction angle $\theta_{D3}$ and may be configured to diffract light rays 418 on second end 464 with a second diffraction angle $\theta_{D4}$. In one embodiment, first diffraction angle $\theta_{D3}$ is a greater angle than second diffraction angle $\theta_{D4}$ so that diffraction grating 454 diffracts light 410 more aggressively from first end 462 and diffracts light 410 less aggressively from second end 464 to reduce the likelihood that light rays are reflected back onto diffraction grating 454. Diffraction grating 454 is configured to diffract light at diffraction angles that progressively become smaller from first end 462 to second end 464, according to an embodiment. Diffraction grating 454 is configured to diffract light at diffraction angles that progressively become larger from first end 462 to second end 464, according to an embodiment. Light rays 416 and 418 are representative of a large number of light rays (e.g., light 410) that are received by a surface 470 and that are diffracted back out of surface 470 at diffraction angles that change from first end 462 to second end 464, according to various aspects of the disclosure.

Diffraction grating 454 is a rolled diffraction grating having a number of slanted grating planes 472 that change (e.g., progressively increase or decrease) the diffraction angle of exiting light rays from first end 462 to second end 464 of diffraction grating 454. Slanted grating planes 472 change the diffraction angle of exiting light rays based on the slant angles of slanted grating planes 472. Diffraction grating 454 maps each position of incident light rays to one or more particular total internal reflection (TIR) angles inside waveguide 456, according to an embodiment. In other words, diffraction grating 454 encodes information onto received light rays by associating a light ray's incident position (on diffraction grating 454) with a TIR angle within waveguide 456, according to an embodiment. The particular TIR angle by which a light ray is received by diffraction grating 458 provides an indication of the light ray's incident position onto diffraction grating 454 (e.g., from eyebox region 208), according to an embodiment. Diffraction grating 458 is configured to decode the light ray's incident position based on the light ray's particular diffraction angle, according to an embodiment. The particular angle by which a light ray exits waveguide 456 and/or is received by image sensor 104 provides an indication of the light ray's incident position and/or angle of incidence onto diffraction grating 454, according to an embodiment.

Slanted grating planes 472 (individually, slanted grating plane 472A, 472B, 472C, etc.) are associated with slant angles φ (individually, slant angle $\varphi_{S1}$, $\varphi_{S2}$, $\varphi_{S3}$) that at least partially define the angle of slanted grating planes 472. For clarity in the illustration, only a limited number of the illustrated slanted grating planes are labeled. However, in practice the number of grating planes having, for example, a few microns of spacing between each other would be difficult to fully illustrate. Slant angles Y are defined with respect to surface 470 of diffraction grating 454, according to an embodiment. Slant angles φ may also be defined with respect to the intersection of surface 470 and the normal to each of slanted grating planes 472, according to an embodiment. Slant angles φ and slanted grating planes 472 are at least partially defined by the techniques described in association with FIG. 5, FIG. 6, and FIG. 7, according to embodiments of the disclosure.

Diffraction grating 458 is configured to receive light rays 416 and 418 (e.g., with a surface 474) and is configured to direct light rays 416 and 418 to image sensor 104. Diffraction grating 458 is a reflective diffraction grating that is configured to operate in reflection to diffract some wavelengths of light (e.g., within the infrared wavelengths) while passing other wavelengths of light (e.g., visible wavelengths). Diffraction grating 458 is a reflective diffraction grating that out-couples light rays 416 and 418 from waveguide 456 to image sensor 104, according to an embodiment. Similar to diffraction grating 454, diffraction grating 458 may be configured to diffract light from surface 474 at a different angle from a first side 478 than from a second side 480. Diffraction grating 458 may be configured to diffract light from first side 478 at a smaller diffraction angle than from second side 480. Diffraction grating 458 may be configured to emit light at diffraction angles that gradually or progressively change from first side 478 to second side 480. The diffraction angles of light rays emitted from surface 474 progressively increase from first side 478 to second side 480, according to an embodiment. The diffraction angles of light rays emitted from surface 474 progressively decreases from first side 478 to second side 480, according to an embodiment.

Diffraction grating 454 is positioned within waveguide 456 near a surface 482 of waveguide 456 to enable diffraction grating 454 to in-couple light 410 into waveguide 456 and to enable diffraction grating 454 to direct light 410 towards diffraction grating 458, according to an embodiment. At least one surface of diffraction grating 454 and surface 482 are on the same plane or at least partially define the same surface, according to an embodiment. Diffraction grating 454 is positioned in waveguide 456 on a lens assembly side 486 of waveguide 456, according to an embodiment. Lens assembly side 486 of waveguide 456 represents a portion of waveguide 456 that transmits scene light 210 to eyebox region 208, according to an embodiment.

Diffraction grating 458 is positioned within waveguide 456 near a surface 484 of waveguide 456 to enable diffraction grating 458 to out-couple light 410 out of waveguide 456 and to enable diffraction grating 458 to direct light 410 towards image sensor 104, according to an embodiment. At least one surface of diffraction grating 458 and surface 484 are on the same plane or at least partially define the same surface, according to an embodiment. Diffraction grating 458 is positioned in waveguide 456 on a frame side 488 of waveguide 456, according to an embodiment. Frame side 488 of waveguide 456 represents a portion of waveguide 456 that is at least partially positioned within or on a surface of a frame of an HMD to enable out-coupling of light to image sensor 104, according to an embodiment.

Waveguide imaging system 450 may optionally include lens 440 that is positioned between waveguide system 452 and image sensor 104. Lens 440 may be constructed from a single optical layer or may include a number of optical layers coupled together to focus light from diffraction grating 458 onto image sensor 104. In one embodiment, diffraction grating 458 and lens 440 are configured to focus light from first end 462 of diffraction grating 454 onto first end 442 of image sensor 104 and are configured to focus light from second end 464 of diffraction grating 454 onto second end 444 of image sensor 104.

Figure 5:
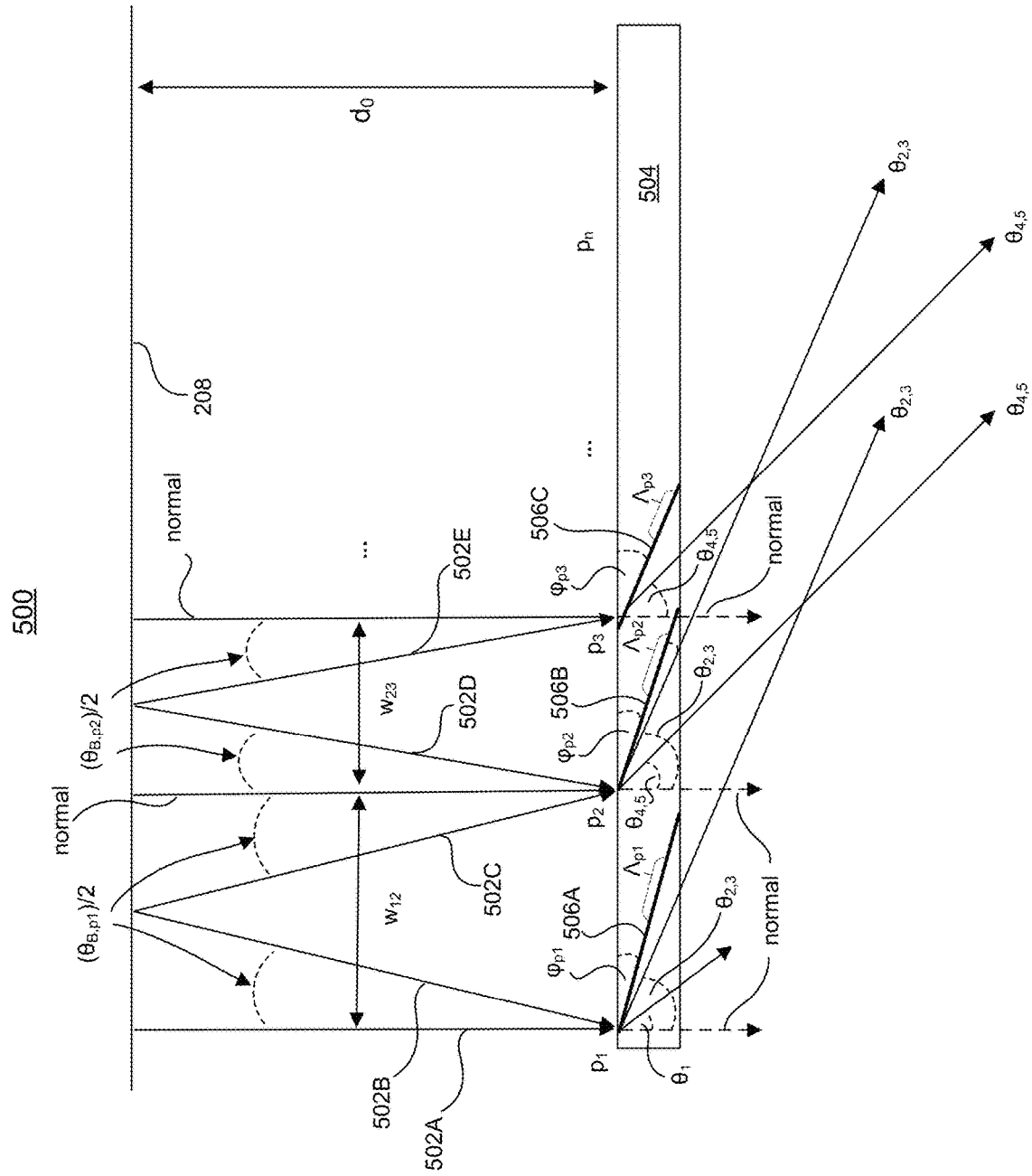
FIG. 5 illustrates a diagram that shows techniques for defining characteristics of a rolled diffraction grating, in accordance with aspects of the disclosure.

FIG. 5 illustrates a diagram 500 for defining and constructing one or more characteristics of waveguide systems 402 and/or 452, in accordance with embodiments of the disclosure. Diagram 500 illustrates light rays 502 (individually, light ray 502A, 502B, 502C, 502D, 502E) incident upon an optical element 504 at a variety of positions p (individually, position $p_1$, $p_2$, $p_3$, $p_n$) to determine diffraction angles, grating periods, and slant angles of slanted grating planes 506 (individually, slanted grating plane 506A, 506B, 506C), in accordance with aspects of the disclosure. Optical element 504 may be a transmissive or reflective diffraction grating (e.g., a holographic optical element), according to various aspects of the disclosure.

To define a first slant angle $\varphi_{p1}$ at a first point $p_1$, a diffraction angle θ1 is defined to be 80° for a first light ray 502A. First light ray 502A originates from eyebox region 208 that is a distance do from optical element 504. First ray 502A has an incident angle of 0°. First slant angle $\varphi_{p1}$ of a first slanted grating plane 506A may be adjusted until diffraction angle $\theta_1$ for first light ray 502A is 80°. A grating period $\Lambda_{p1}$ is a transversal distance between adjacent grating lines on slanted grating planes 506 and is based on the wavelength of light being selectively diffracted (e.g., 850 nm). Grating period $\Lambda_{p1}$ and slant angle $\varphi_{p1}$ are adjusted at $p_1$ until diffraction angle θ1 is 80° for first light ray 502A. Diffraction angle θ1 may be measured from a normal to a surface (e.g., exit surface) of optical element 504.

Once the grating period $\Lambda_{p1}$ and slant angle $\varphi_{p1}$ for first slanted grating plane 506A have been determined at first point $p_1$ to achieve a particular diffraction angle, an angular bandwidth $\theta_{B,p1}$ at first point $p_1$ is determined. As an example, angular bandwidth $\theta_{B,p1}$ may be determined by directing various light rays at first point $p_1$ with different incident angles until the angle of diffraction exceeds a predetermined threshold.

Having determined angular bandwidth $\theta_{B,p1}$, a second light ray 502B is emitted or directed to first point $p_1$ at an incident angle of $-\theta_{B,p1}/2$ (negative theta divided by 2). An angle $\theta_{2,3}$ is the resulting diffraction angle from first point $p_1$ of second light ray 502B. Angle $\theta_{2,3}$ may be measured from a normal to a surface (e.g., exit surface) of optical element 504.

At a second point $p_2$, a grating period $\Lambda_{p2}$ and a slant angle $\varphi_{p2}$ of a second slanted grating plane 506B are adjusted to so that a third light ray 502C also diffracts at diffraction angle $\theta_{2,3}$. Third light ray 502C is emitted or directed to second point $p_2$ with an incident angle of $\theta_{B,p1}/2$ (positive theta divided by 2). Second point $p_2$ is determined as a distance $w_{12}$ from first point $p_1$ along the surface of optical element 504, according to an embodiment. Distance $w_{12}$ may be defined in accordance with Equation 1, which is:

$$w_{12} = 2 * d_0 * \tan(\theta_{B,p1}/2).$$

To determine a grating period $\Lambda_{p3}$ and a slant angle $\varphi_{p3}$ at a third point $p_3$, a diffraction angle $\theta_{4,5}$ is determined from second point $p_2$. Diffraction angle $\theta_{4,5}$ may be determined based on an angular bandwidth $\theta_{B,p2}/2$ of second point $p_2$. Angular bandwidth $\theta_{B,p2}$ may be determined by directing various light rays at second slanted grating plane 506B at second point $p_2$ from various incident angles until the angle of diffraction exceeds a predetermined threshold. Fourth light ray 502D is emitted or directed towards second point $p_2$ at an incident angle $-\theta_{B,p2}/2$ (negative theta divided by 2), and the resulting diffraction angle of fourth light ray 502D is diffraction angle $\theta_{4,5}$. Angle $\theta_{4,5}$ may be measured from a normal to a surface (e.g., exit surface) of optical element 504.

Grating period $\Lambda_{p3}$ and slant angle $\varphi_{p3}$ of a third slanted grating plane 506C are determined at third point $p_3$, at least partially based on diffraction angle $\theta_{4,5}$. Third point $p_3$ is determined as a distance $w_{23}$ from second point $p_2$ along the surface of optical element 504, according to an embodiment. Distance $w_{23}$ may be defined in accordance with Equation 2, which is:

$$w_{23}=2*d_0*\tan(\theta_{B,p2}/2).$$

Values for grating period $\Lambda_{p3}$ and slant angle $\varphi_{p3}$ are determined by adjusting grating period $\Lambda_{p3}$ and slant angle $\varphi_{p3}$ until a fifth light ray 502E diffracts from slanted grating plane 506C at diffraction angle $\theta_{4,5}$. Fifth light ray 502E is emitted or directed towards third point $p_3$ at an incident angle of $\theta_{B,p2}/2$ (theta divided by 2) while adjusting grating period $\Lambda_{p3}$ and slant angle $\varphi_{p3}$ according to an embodiment.

The general sequence discussed for determining characteristics of slanted grating planes 506 may be repeatedly applied for the entire length of optical element 504 to generate an optical element with slanted grating planes that operate to diffract light in accordance with the diffraction gratings described herein (e.g., diffraction grating 404, 454), in accordance with embodiments of the disclosure. This sequence may be repeated until a critical diffraction angle is reached where diffracted light rays from slanted grating planes no longer experience TIR within the waveguide.

In some embodiments, the process of identifying and defining characteristics of optical element 504 is performed by one or more processors configured to operate fabrication or manufacturing equipment used to, for example, record and/or test optical elements, diffraction gratings, waveguide systems, waveguide imaging systems, and/or HMDs, according to various embodiments.

Figure 6:
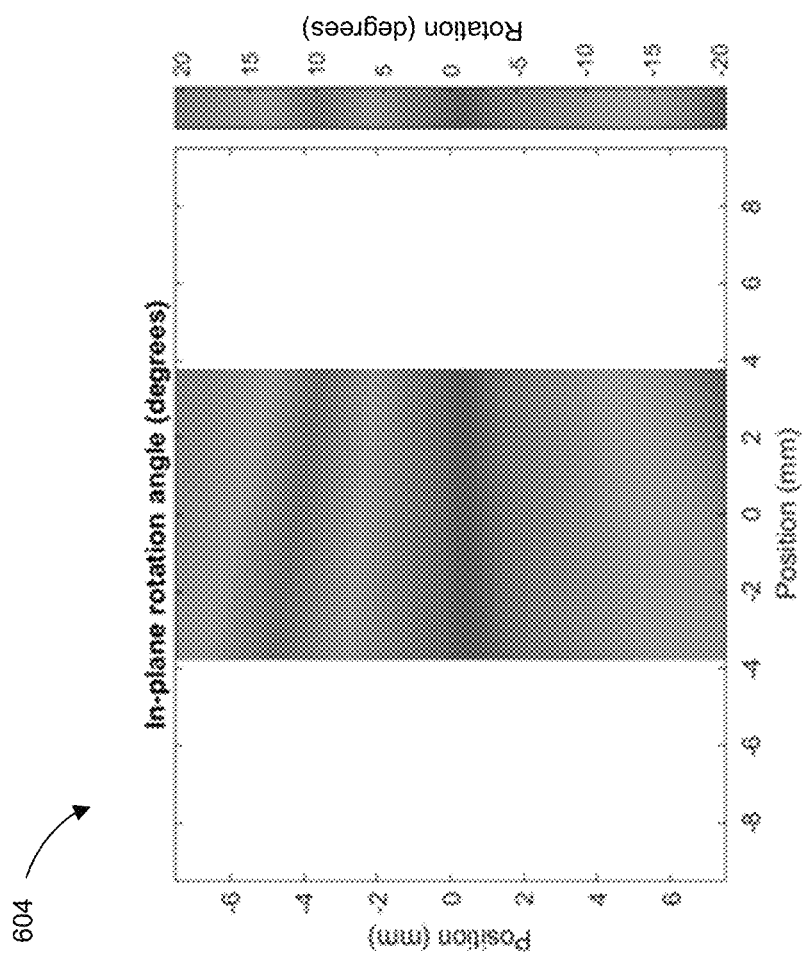
FIG. 6 illustrates a diagram of a top view of a waveguide system and a rotational angle chart for a rolled diffraction grating, in accordance with aspects of the disclosure.
Figure 6:
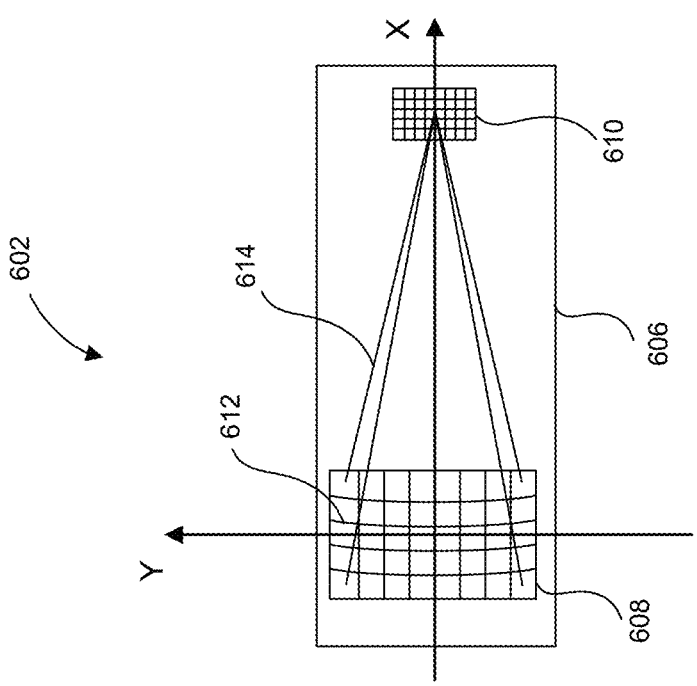

FIG. 6 illustrates a diagram 600 that shows optical characteristics of waveguide systems and diffraction gratings, according to aspects of the disclosure. Diagram 600 includes a top view of a waveguide system 602 that at least partially operates with rotation angles illustrated in chart 604, according to an embodiment. Waveguide system 602 includes a waveguide 606, an in-coupling diffraction grating 608, and an out-coupling diffraction grating 610, according to an embodiment. Waveguide system 602 is an example of a top view of waveguide systems 102, 216, 402, and/or 452, according to an embodiment. In-coupling diffraction grating 608 is an example top view of diffraction grating 404 and/or 454, according to an embodiment. Out-coupling diffraction grating 610 is an example top view of diffraction grating 408 and/or 458, according to an embodiment.

In-coupling diffraction grating 608 includes slanted grating planes 612 that are arcuately and concavely curved with respect to the direction of out-coupling diffraction grating 610, according to an embodiment. The curvature of slanted grating planes 612 directs light rays 614 (at various angles) towards out-coupling diffraction grating 610 and enables out-coupling diffraction grating 610 to have a smaller receiving surface area than the emitting surface area of in-coupling diffraction grating 608, according to an embodiment. The smaller surface area of out-coupling diffraction grating 610 enables easier concealment and placement of out-coupling diffraction grating 610 within or on a frame of an HMD, according to an embodiment. The larger surface area of in-coupling diffraction grating 608 may enable reception and in-coupling of more light from an eyebox region of an HMD or from a user's eye for an HMD. Chart 604 show how many degrees of rotation a light ray (e.g., light ray 614) experiences based on the positive and negative displacement of the light ray along the x-axis and y-axis of in-coupling diffraction grating 608, according to one embodiment.

Figure 7:
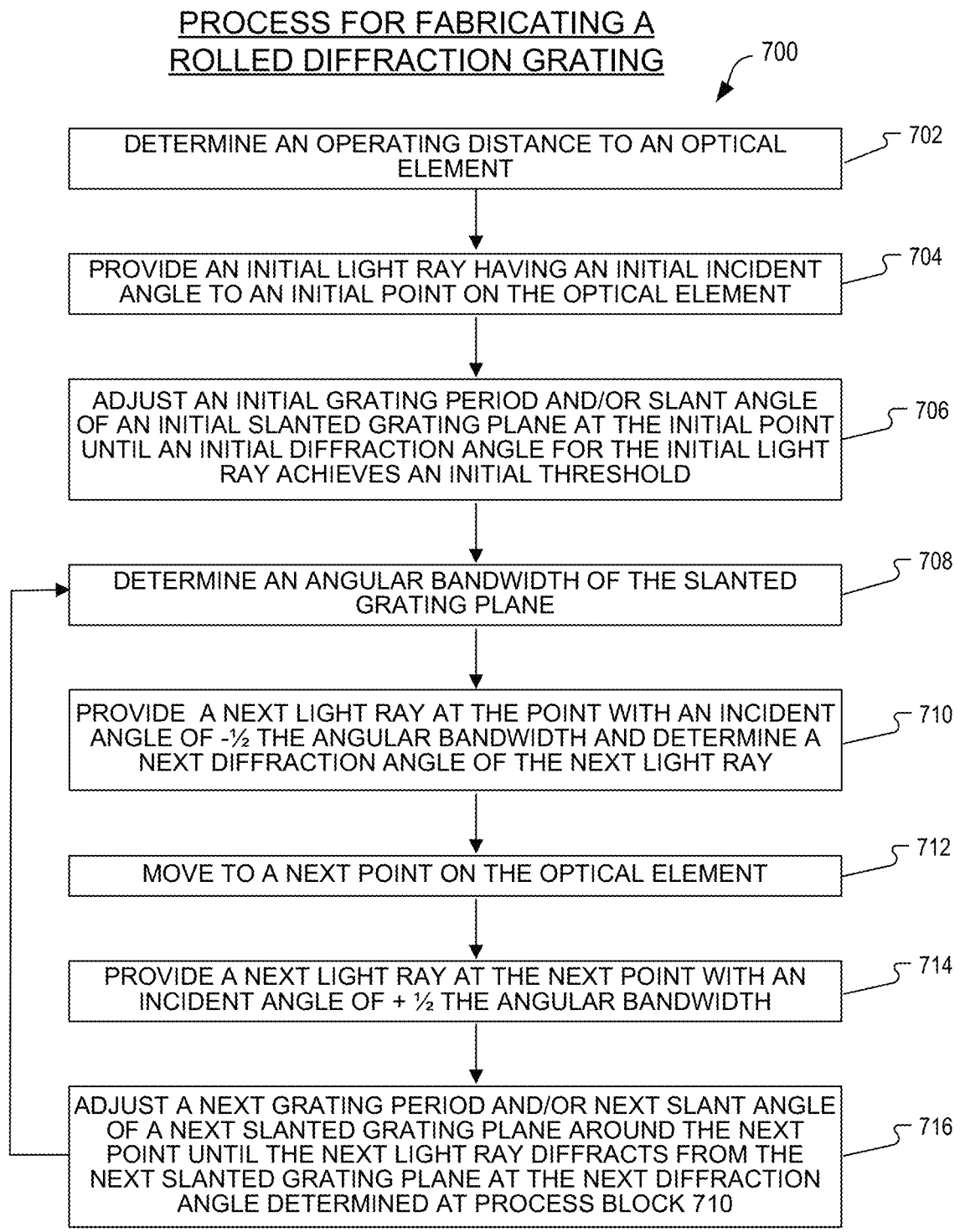
FIG. 7 illustrates a flow diagram of a process for fabricating a rolled diffraction grating, in accordance with aspects of the disclosure.

FIG. 7 illustrates a process 700 for fabricating a rolled diffraction grating, according to an embodiment. Process 700 may be incorporated into one or more fabrication systems including one or more processors and one or more laser controllers configured to record diffraction patterns in a recording medium to create, for example, a volume grating, according to an embodiment. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

At process block 702, process 700 determines an operating distance to an optical element, according to an embodiment. The operating distance may be a distance between the optical element and an eyebox region or eye of a user. The optical element may be a recording medium from which a holographic optical element may be fabricated. Process block 702 may proceed to process block 704, according to an embodiment.

At process block 704, process 700 provides an initial light ray having an initial incident angle to an initial point on the optical element, according to an embodiment. The initial incident angle may be 0°. Process block 704 may proceed to process block 706, according to an embodiment.

At process block 706, process 700 adjusts an initial grating period and/or slant angle of an initial slanted grating plane at the initial point until an initial diffraction angle for the initial light ray achieves an initial threshold, according to an embodiment. The initial threshold may be a predetermined threshold, such as 80°. Process block 706 may proceed to process block 708, according to an embodiment.

At process block 708, process 700 determines an angular bandwidth of the slanted grating plane, according to an embodiment. Process block 708 proceeds to process block 710, according to an embodiment.

At process block 710, process 700 provides a next light ray at the point with an incident angle of $-\frac{1}{2}$ the angular bandwidth and determines a next diffraction angle of the next light ray, according to an embodiment. Process block 710 proceeds to process block 712, according to an embodiment.

At process block 712, process 700 moves to a next point on the optical element, according to an embodiment. Process block 712 proceeds to process block 714, according to an embodiment.

At process block 714, process 700 provides a next light ray at the next point with an incident angle of $+\frac{1}{2}$ the angular bandwidth, according to an embodiment. Process block 714 proceeds to process block 716, according to an embodiment.

At process block 716, process 700 adjusts a next grating period and/or next slant angle of a next slanted grating plane around the next point until the next light ray diffracts from the next slanted grating plane at the next diffraction angle determined at process block 710, according to an embodiment. Process block 716 proceeds to process block 708, until the next diffraction angle meets or exceeds a critical angle threshold, according to an embodiment.

Figure 8:
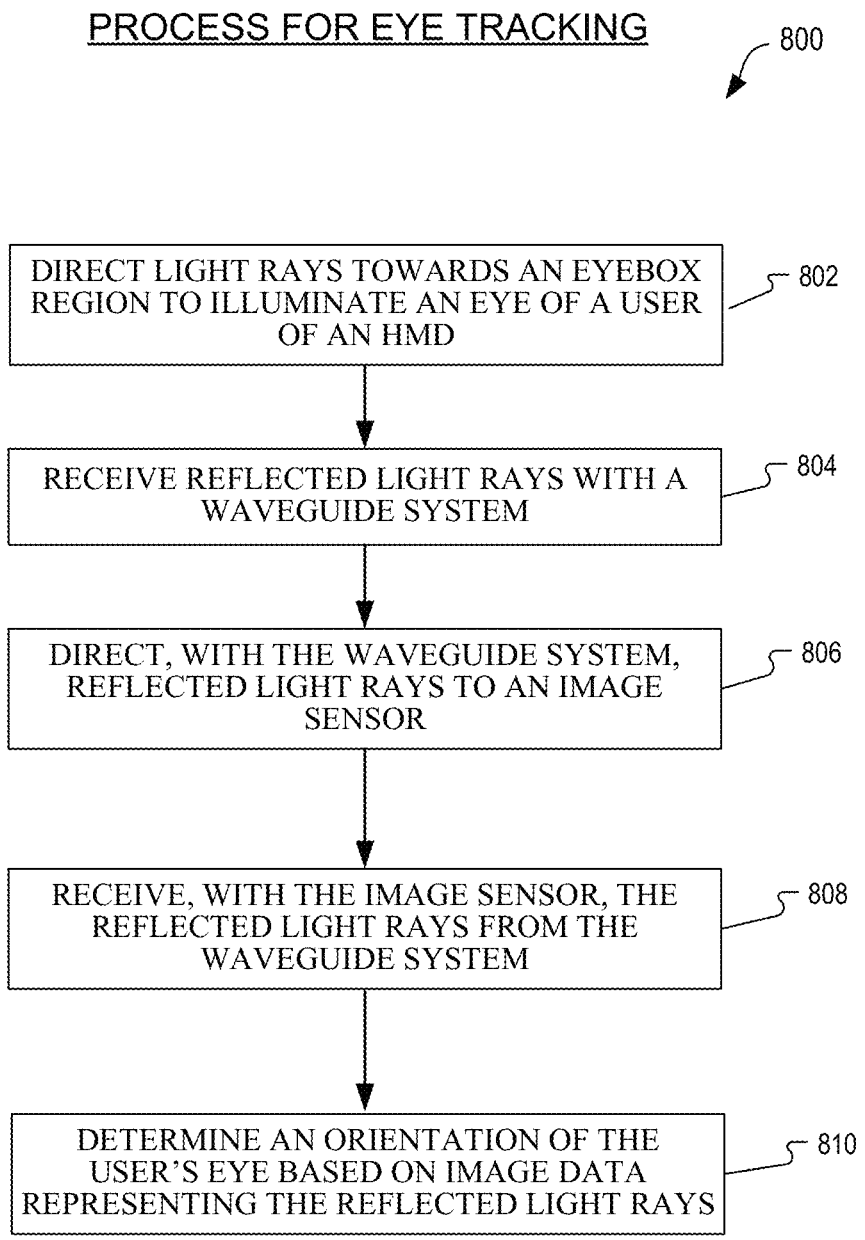
FIG. 8 illustrates a flow diagram of a process for eye tracking, in accordance with aspects of the disclosure.

FIG. 8 illustrates a process 800 for eye tracking, according to an embodiment. Process 800 may be at least partially incorporated into one or more HMDs (e.g., in controller 118) disclosed herein. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

At process block 802, process 800 directs light rays towards an eyebox region to illuminate an eye of a user of an HMD, according to an embodiment. Directing light rays towards eyebox region may include emitting infrared light towards eyebox region using one or more light sources (e.g., LEDs). Process block 802 may proceed to process block 804, according to an embodiment.

At process block 804, process 800 receives reflected light rays with a waveguide system, according to an embodiment. The waveguide system may include any of the waveguide systems disclosed herein and may include an in-coupling diffraction grating and an out-coupling diffraction grating positioned on or within a waveguide. The in-coupling diffraction grating and/or the out-coupling diffraction grating may be rolled diffraction gratings, in accordance with aspects of the disclosure. The waveguide system may be at least partially included in a lens assembly and may be at least partially positioned in a frame of an HMD. Process block 804 may proceed to process block 806, according to an embodiment.

At process block 806, process 800 directs, with the waveguide system, reflected light rays to an image sensor, according to an embodiment. The image sensor may be positioned in or on a frame of an HMD to receive the reflected light rays from the waveguide system. Process block 806 may proceed to process block 808, according to an embodiment.

At process block 808, process 800 receives, with the image sensor, the reflected light rays from the waveguide system, according to an embodiment. The image sensor may convert the reflected light rays from optical to electrical signals and save or provide the electrical signals to a controller as image data. Process block 808 proceeds to process block 810, according to an embodiment.

At process block 810, process 800 determines an orientation of the user's eye based on image data representing the reflected light rays, according to an embodiment.

FIGS. 9A-12 illustrate embodiments of a multi-directional gratings in a waveguide system and a related process, in accordance with aspects of the disclosure. The multi-directional gratings in the waveguide system may be configured to: i) spatially encode portions of the eyebox region and ii) expand the eyebox region from which reflections can be detected.

Figure 9A:
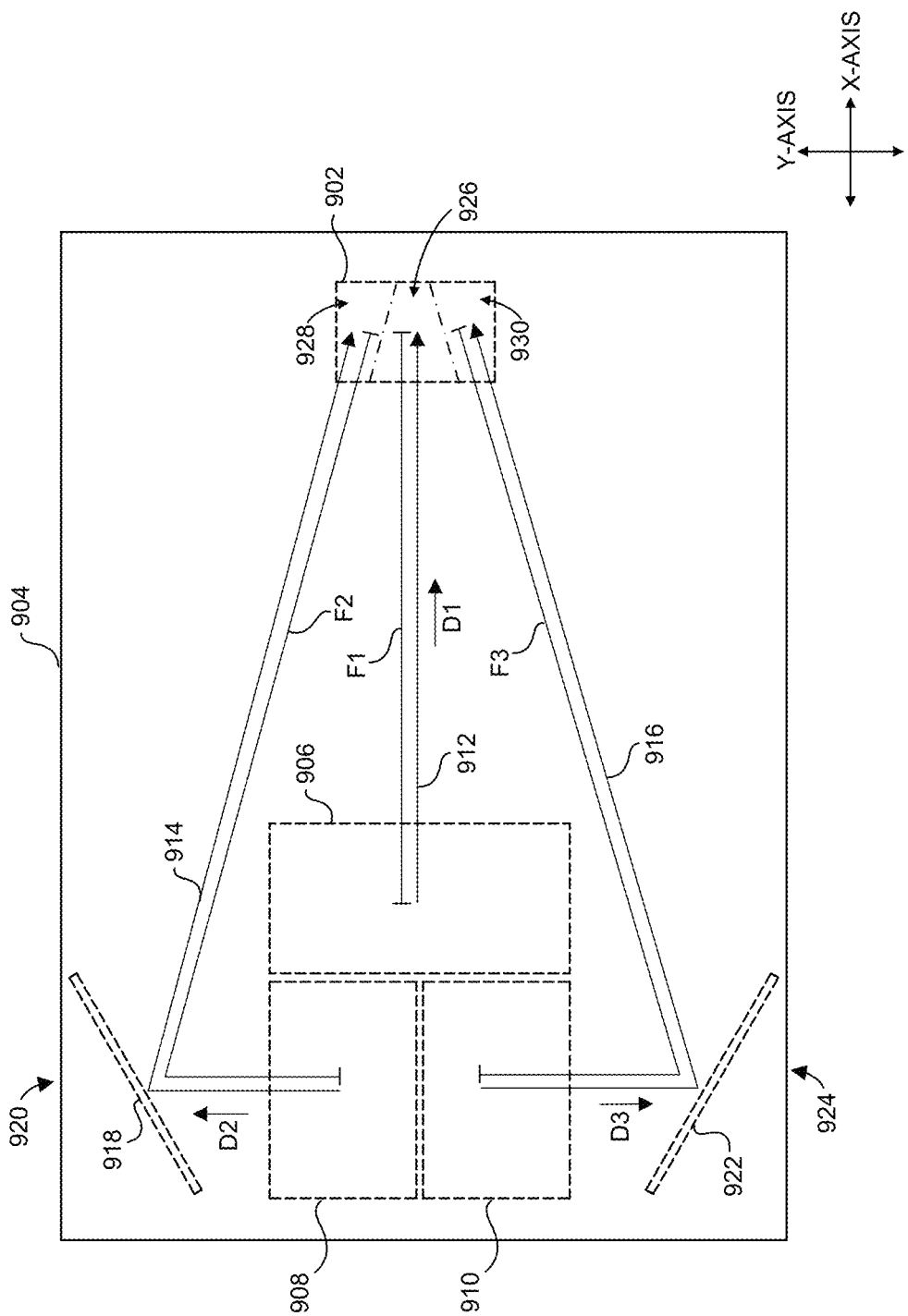
FIGS. 9A, 9B, and 9C illustrate diagrams of various views of a waveguide system having multi-directional gratings, in accordance with aspects of the disclosure.

FIG. 9A illustrates a top view diagram of a waveguide system 900 having multi-directional gratings to support in-field eye tracking, in accordance with aspects of the disclosure. A single diffraction grating may experience performance or operational limitations if constructed to be large enough to cover (e.g., receive reflections from) an entire eyebox region. Waveguide system 900 includes multiple in-coupling diffraction gratings that operate together to expand the size or area of an eyebox region from which reflections may be detected and operated on, according to an embodiment. The multiple in-coupling diffraction gratings are configured to direct incoming light towards focal regions of an out-coupling diffraction grating using various focal directions, various light paths, various focal points, and/or various focal lengths, according to embodiments of the disclosure. By directing received light into different directions, along different light paths, and towards different focal points on the out-coupling diffraction grating, waveguide system 900 may be able to use a single out-coupling diffraction grating to out-couple light from multiple in-coupling diffraction gratings to an image sensor. Accordingly, waveguide system 900 may support in-field eye tracking for, for example, an HMD, according to various embodiments.

Waveguide system 900 is an example implementation of waveguide system 102 (shown in FIG. 1) and waveguide system 216 (shown in FIGS. 2 and 3). The various techniques described above in relation to FIGS. 4-8 may be applied to waveguide system 900, in accordance with aspects of the disclosure. Waveguide system 900 may include an out-coupling diffraction grating 902 disposed in a waveguide 904. Waveguide system 900 may also include an in-coupling diffraction grating 906, an in-coupling diffraction grating 908, and an in-coupling diffraction grating 910 configured to direct received light into different directions and towards out-coupling diffraction grating 902. In-coupling diffraction grating 906, in-coupling diffraction grating 908, and in-coupling diffraction grating 910 may be each be configured to receive light from a particular portion of an eyebox region so that in-coupling diffraction gratings 906, 908, and 910 work together to provide coverage for the eyebox region.

In-coupling diffraction grating 906 may be positioned in waveguide 904 and may be oriented and configured to direct light 912 towards out-coupling diffraction grating 902. Light 912 may be representative of a portion of reflected light received from a particular portion of an eyebox region. In-coupling diffraction grating 906 may be configured to direct light 912 in a focal direction D1 towards out-coupling diffraction grating 902. Focal direction D1 may be, for example, generally along the positive x-axis of waveguide 904. In-coupling diffraction grating 906 may be a volume Bragg grating or other holographic optical element that is configured to focus light 912 from the larger footprint (e.g., bottom surface area) of in-coupling diffraction grating 906 onto a smaller footprint (e.g., bottom surface area) of out-coupling diffraction grating 902. In-coupling diffraction grating 906 may focus light 912 onto out-coupling diffraction grating 902 using a focal length of F1, according to an embodiment. Focal length F1 may be generally measured from a center of in-coupling diffraction grating 906 to a center or particular focal point of out-coupling diffraction grating 902.

In-coupling diffraction grating 908 may be disposed in waveguide 904 and may be positioned adjacent to in-coupling diffraction grating 906. In-coupling diffraction grating 908 may be configured to direct light 914 towards out-coupling diffraction grating 902 by initially focusing light 914 in a focal direction D2. Focal direction D2 may be, for example, generally along the positive y-axis of waveguide 904. Focal direction D2 may be different than focal direction D1. Focal direction D2 may be approximately perpendicular to focal direction D1 or may have some other angular offset (e.g., 30°, 45°, etc.) from focal direction D1 to support directing light 914 along a different path towards out-coupling diffraction grating 902. Light 914 may be representative of a portion of reflected light received from a particular portion of an eyebox region that is different than light 912. In-coupling diffraction grating 908 may be a volume Bragg grating or other holographic optical element that is configured to focus light 914 from the larger footprint (e.g., bottom surface area) of in-coupling diffraction grating 908 onto the smaller footprint (e.g., bottom surface area) of out-coupling diffraction grating 902.

In-coupling diffraction grating 908 may direct light 914 towards out-coupling diffraction grating 902 by directing light 914 onto a reflective surface 918, and reflective surface 918 may be configured to redirect light 914 onto out-coupling diffraction grating 902. Reflective surface 918 may be a mirror that is integrated into or formed in waveguide 904. In one embodiment, reflective surface 918 may be a side surface 920 of waveguide 904 that is angled or otherwise shaped to reflect light towards out-coupling diffraction grating 902. In-coupling diffraction grating 908 may be configured to focus light 914 onto out-coupling diffraction grating 902 (using reflective surface 918) with a focal length F2, according to an embodiment. Focal length F2 may be generally measured from a center of in-coupling diffraction grating 908 to a center of out-coupling diffraction grating 902, and focal length F2 may include the path of light 914 to reflective surface 918. Focal length F2 may be longer than focal length F1.

In-coupling diffraction grating 910 may be disposed in waveguide 904 and may be positioned adjacent to in-coupling diffraction gratings 906 and 908. In-coupling diffraction grating 910 may be configured to direct light 916 towards out-coupling diffraction grating 902 by initially focusing light 916 in a focal direction D3. Focal direction D3 may be, for example, generally along the negative y-axis of waveguide 904. Focal direction D3 may be different than focal direction D2 and focal direction D1. Focal direction D3 may be approximately perpendicular to focal direction D1 and may be approximately parallel (in the opposite direction) to focal direction D2. In relation to focal direction D2, focal direction D3 may have some angular offset (e.g., 140°, 160°, 180°, 220°, etc.) to support directing light 916 along a different path towards out-coupling diffraction grating 902. Light 916 may be representative of a portion of reflected light received from a particular portion of an eyebox region that is different than the origins of both light 912 and 914. In-coupling diffraction grating 910 may be a volume Bragg grating or other holographic optical element that is configured to focus light 916 from the larger footprint (e.g., bottom surface area) of in-coupling diffraction grating 910 onto the smaller footprint (e.g., bottom surface area) of out-coupling diffraction grating 902.

In-coupling diffraction grating 910 may direct light 916 towards out-coupling diffraction grating 902 by directing light 916 onto a reflective surface 922, and reflective surface 922 may be configured to redirect light 916 onto out-coupling diffraction grating 902. Reflective surface 922 may be a mirror that is integrated into or formed in waveguide 904. In one embodiment, reflective surface 922 may be a side surface 924 of waveguide 904 that is angled or otherwise shaped to reflect light towards out-coupling diffraction grating 902. In-coupling diffraction grating 910 may be configured to focus light 916 onto out-coupling diffraction grating 902 (using reflective surface 922) with a focal length F3, according to an embodiment. Focal length F3 may be generally measured from a center of in-coupling diffraction grating 910 to a center of out-coupling diffraction grating 902, and focal length F3 may include the path of light 916 to reflective surface 922. Focal length F3 may be longer than focal length F1, and may be equidistant, longer, or shorter than focal length F2, according to various embodiments.

In-coupling diffraction gratings 906, 908, and 910 may be configured to operate in reflection or in transmission to diffract light towards out-coupling diffraction grating 902. In-coupling diffraction gratings 906, 908, and 910 may include slanted grating planes similar to diffraction gratings described herein and illustrated in FIGS. 4B, 5, and/or 6 to direct light towards out-coupling diffraction grating 902. Out-coupling diffraction grating 902 may be configured to operate in reflection or transmission to diffract light out of waveguide 904 and onto one or more image sensors (similar to other embodiments disclosed herein). In-coupling diffraction gratings 906, 908, and 910 and out-coupling diffraction grating 902 may be configured to diffract a particular wavelength of, for example, near-infrared light and may be configured to pass visible light or other wavelengths of light. Waveguide 904 may be configured to pass any wavelength of light.

Figure 10B:
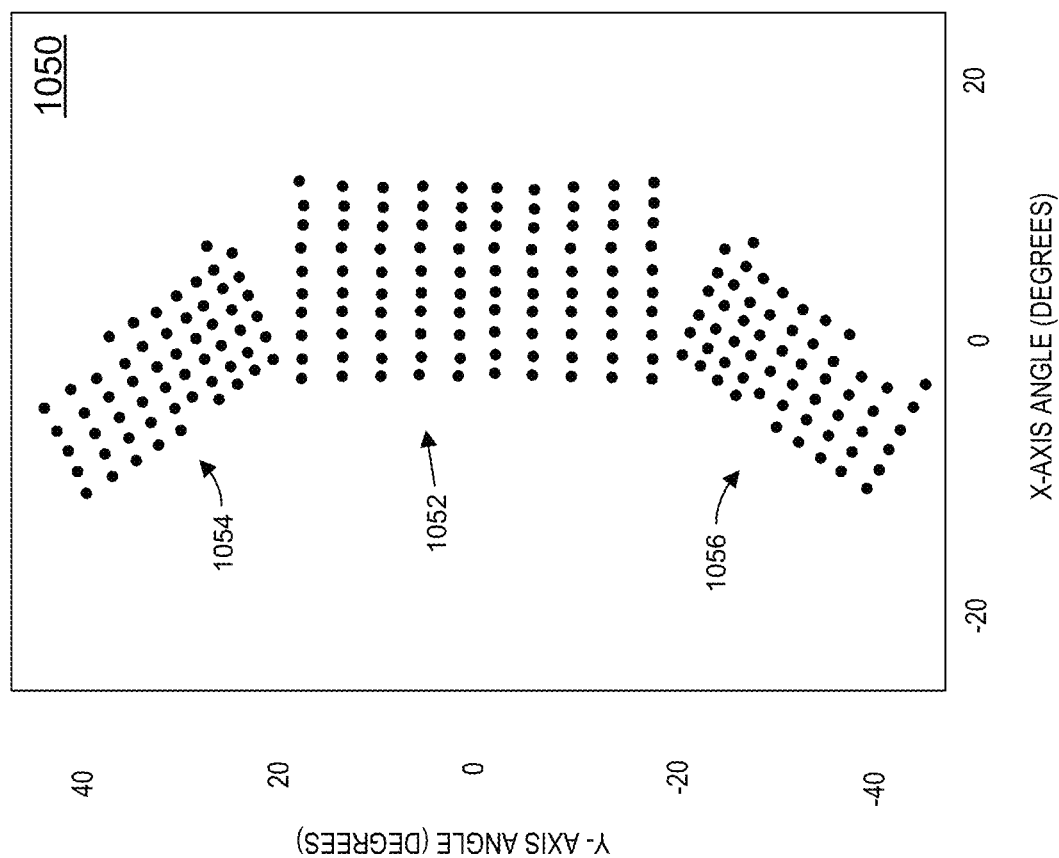
FIG. 10B illustrates a diagram representing spatial locations of eye reflections that are mapped to angles in the waveguide system of FIG. 10A, in accordance with aspects of the disclosure.
Figure 11:
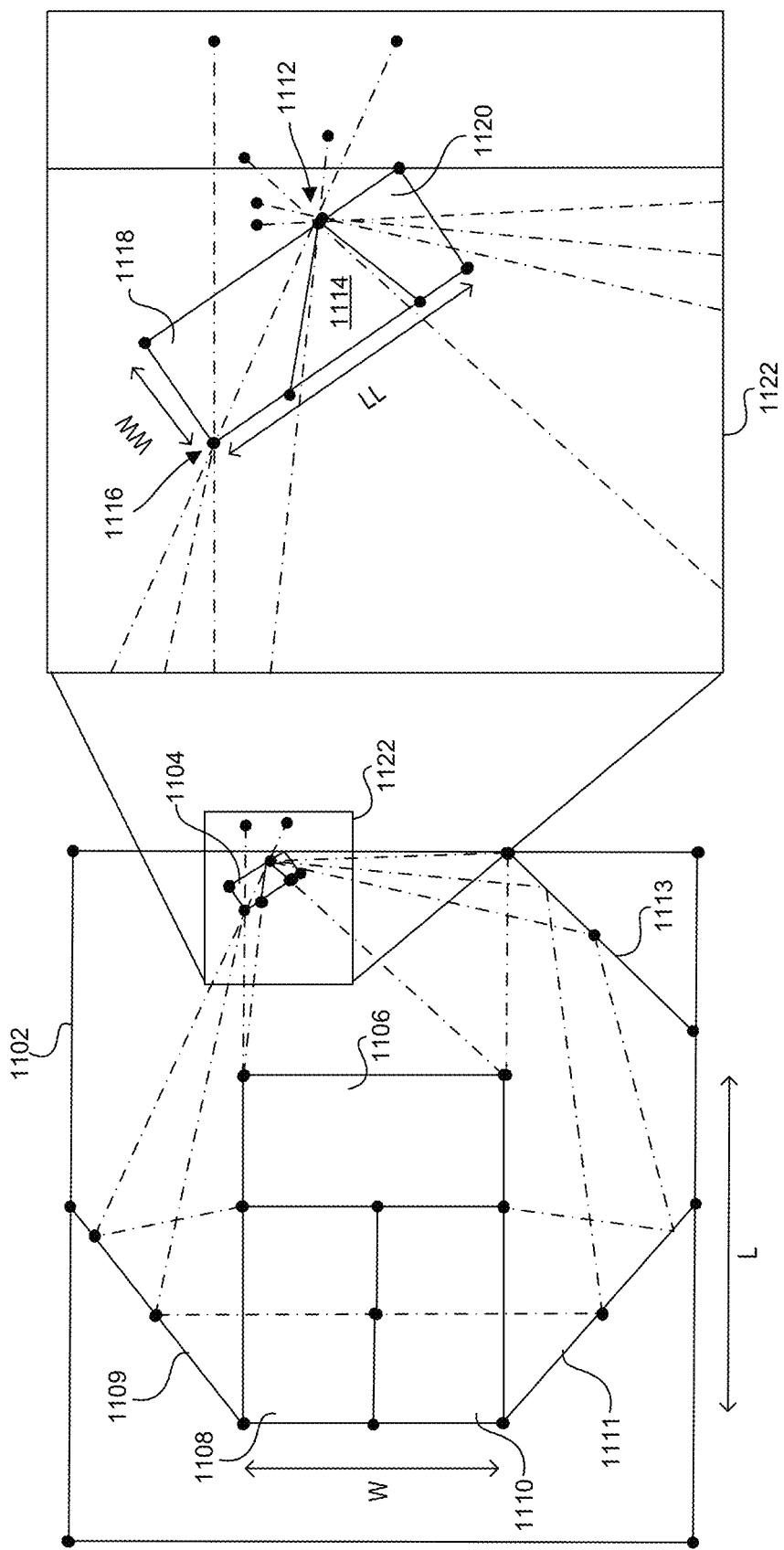
FIG. 11 illustrates a top view of a waveguide system having multi-directional gratings and multiple lateral reflective surfaces, in accordance with aspects of the disclosure.

Out-coupling diffraction grating 902 may have focal regions that each receive light from respective ones of in-coupling diffraction gratings 906, 908, and 910. Out-coupling diffraction grating 902 may have a focal region 926, a focal region 928, and a focal region 930 that are predominantly configured to receive light from in-coupling diffraction gratings 906, 908, and 910, respectively. In other words, in-coupling diffraction grating 906 may be configured to have a focal point that is within focal region 926, in-coupling diffraction grating 908 may be configured to have a focal point that is within focal region 928, and in-coupling diffraction grating 910 may be configured to have a focal point that is within focal region 930, as an example. In other embodiments, different ones of in-coupling diffraction gratings 906, 908, and 910 may be configured to have focal points on different focal regions of out-coupling diffraction grating 902 (e.g., as shown in FIG. 11). The mapping between focal points and focal regions may be used to map and decode eye orientations and/or the origins of particular light rays, as illustrated in FIG. 10B and described herein.

Figure 9B:
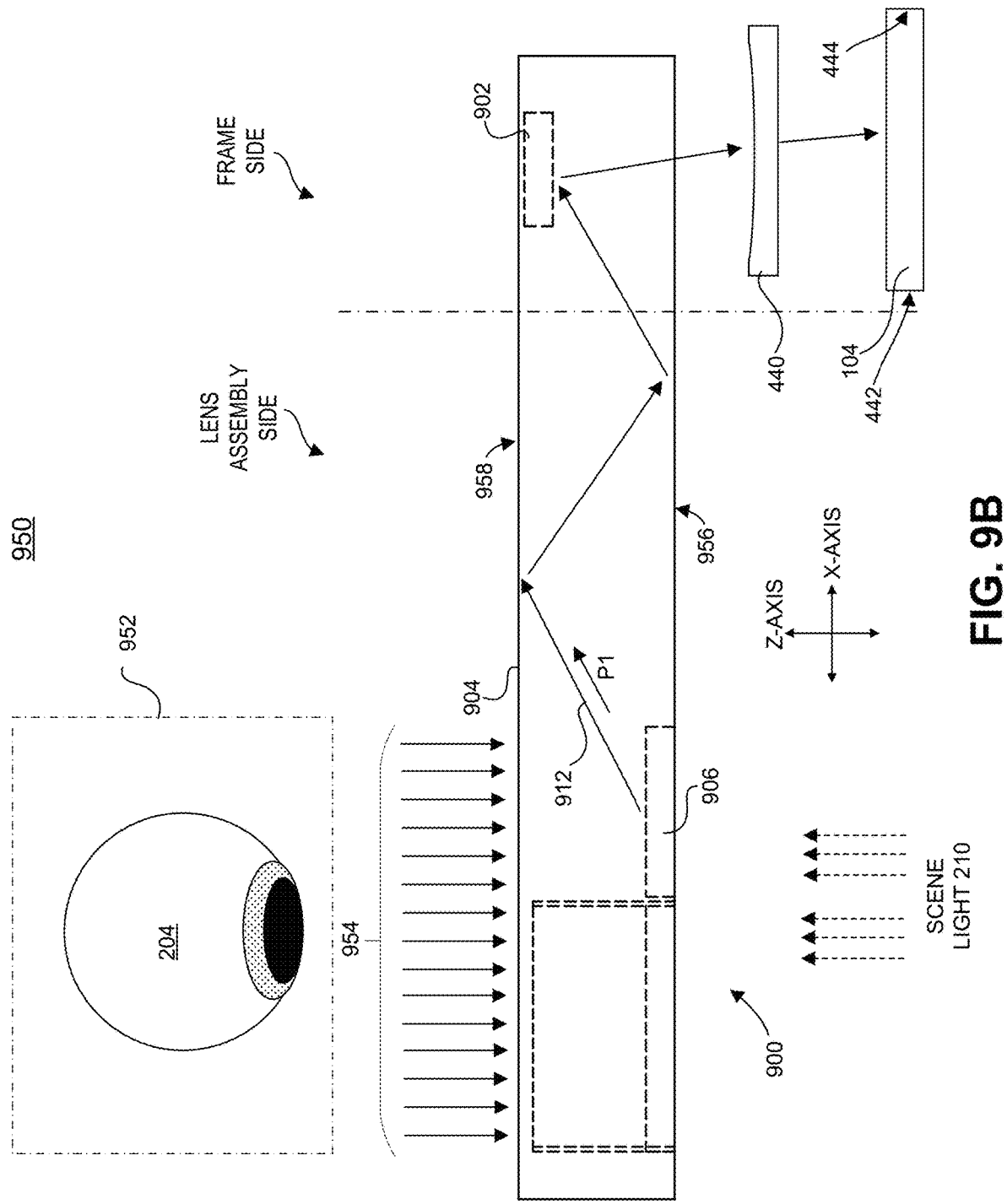

FIG. 9B illustrates a side view diagram of a waveguide imaging system 950 that illustrates an example light path of multi-directional gratings in waveguide 904, in accordance with aspects of the disclosure. Waveguide imaging system 950 may include waveguide system 900, eyebox region 952, image sensor 104, and lens 440. Scene light 210 may be incident on a bottom surface 956 of waveguide 904 and pass though waveguide system 900 to eyebox region 952. Eyebox region 952 may receive non-visible light (e.g., a single wavelength in the near-infrared band) from one or more light sources configured to illuminate eye 204 and/or eyebox region 952. Light 954 is light that has been reflected off of eye 204 or otherwise reflected from eyebox region 952. Light 954 may be incident on a top surface 958 of waveguide 904. Light 954 may represent a combination of light 912, 914, and 916. The diffraction gratings of waveguide system 900 may be configured to operate on light 954 and be configured to pass scene light 210.

In-coupling diffraction grating 906 may diffract light 912 along a light path P1 that includes multiple reflections. Light path P1 may include one or more reflections (e.g., TIR) off of top surface 958 and bottom surface 956 while light 912 propagates along, for example, the positive x-axis of waveguide 904. Focal length F1 (shown in FIG. 9A) may include the length of the reflections or may be based on a direct path between in-coupling diffraction grating 906 and out-coupling diffraction grating 902.

Figure 9C:
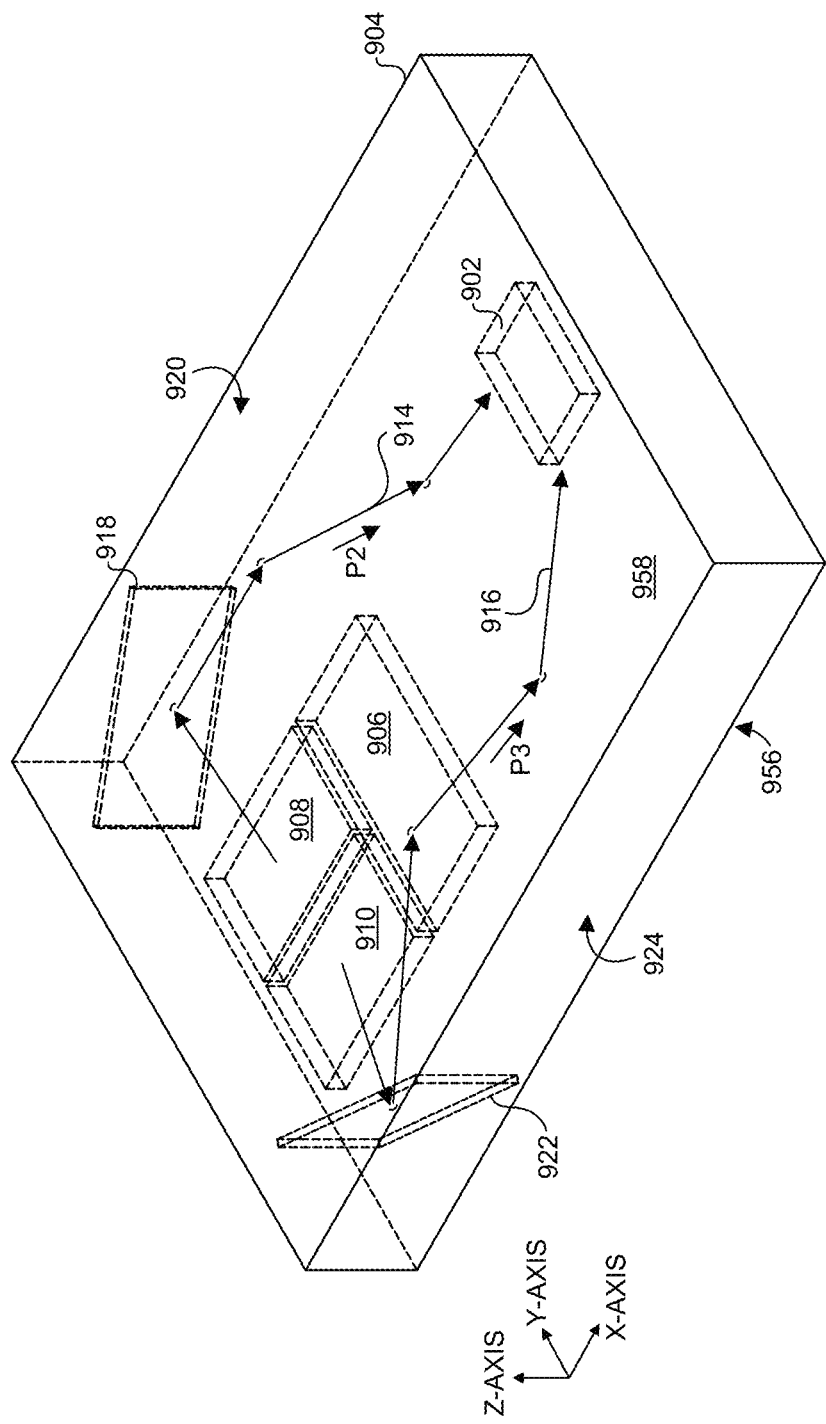

FIG. 9C illustrates a top perspective view of a diagram of waveguide system 900 that illustrates example light paths of multi-directional gratings in waveguide 904, in accordance with aspects of the disclosure. In-coupling diffraction grating 908 may diffract light 914 along a light path P2 that includes multiple reflections. Light path P2 may include one or more lateral reflections (e.g., off of reflective surface 918 and may include one or more reflections (e.g., TIR) off of top surface 958 and bottom surface 956. Light path P2 may include light 914 propagating from in-coupling diffraction grating 908 along the positive y-axis and positive z-axis of waveguide 904. Light path P2 may include a reflection off of reflective surface 918. Light path P2 may then include propagating along the negative y-axis, along the positive x-axis, and along the positive z-axis. Light path P2 may include one or more additional reflections off of top surface 958 and bottom surface 956 until light 914 reaches out-coupling diffraction grating 902. As described above in connection with FIGS. 4A, 4B, 5, and 6, light may be diffracted at different angles from the diffraction gratings, based on the incident position of the light on the particular diffraction grating. Therefore, light from a particular diffraction grating may experience more or fewer reflections than other light, based on the incident position of the light on the particular diffraction grating. It is to be understood that the representation of light 912, 914, and 916 is simplified for illustrative purposes.

In-coupling diffraction grating 910 may diffract light 916 along a light path P3 that includes multiple reflections. Light path P3 may include one or more lateral reflections (e.g., off of reflective surface 922) and may include one or more reflections (e.g., TIR) off of top surface 958 and bottom surface 956. Light path P3 may include light 916 propagating from in-coupling diffraction grating 910 along the negative y-axis and positive z-axis of waveguide 904. Light path P3 may include a reflection off of reflective surface 922. Light path P3 may then include propagating along the positive y-axis, along the positive x-axis, and along the positive z-axis. Light path P3 may include one or more additional reflections off of top surface 958 and bottom surface 956 until light 916 reaches out-coupling diffraction grating 902.

Figure 10A:
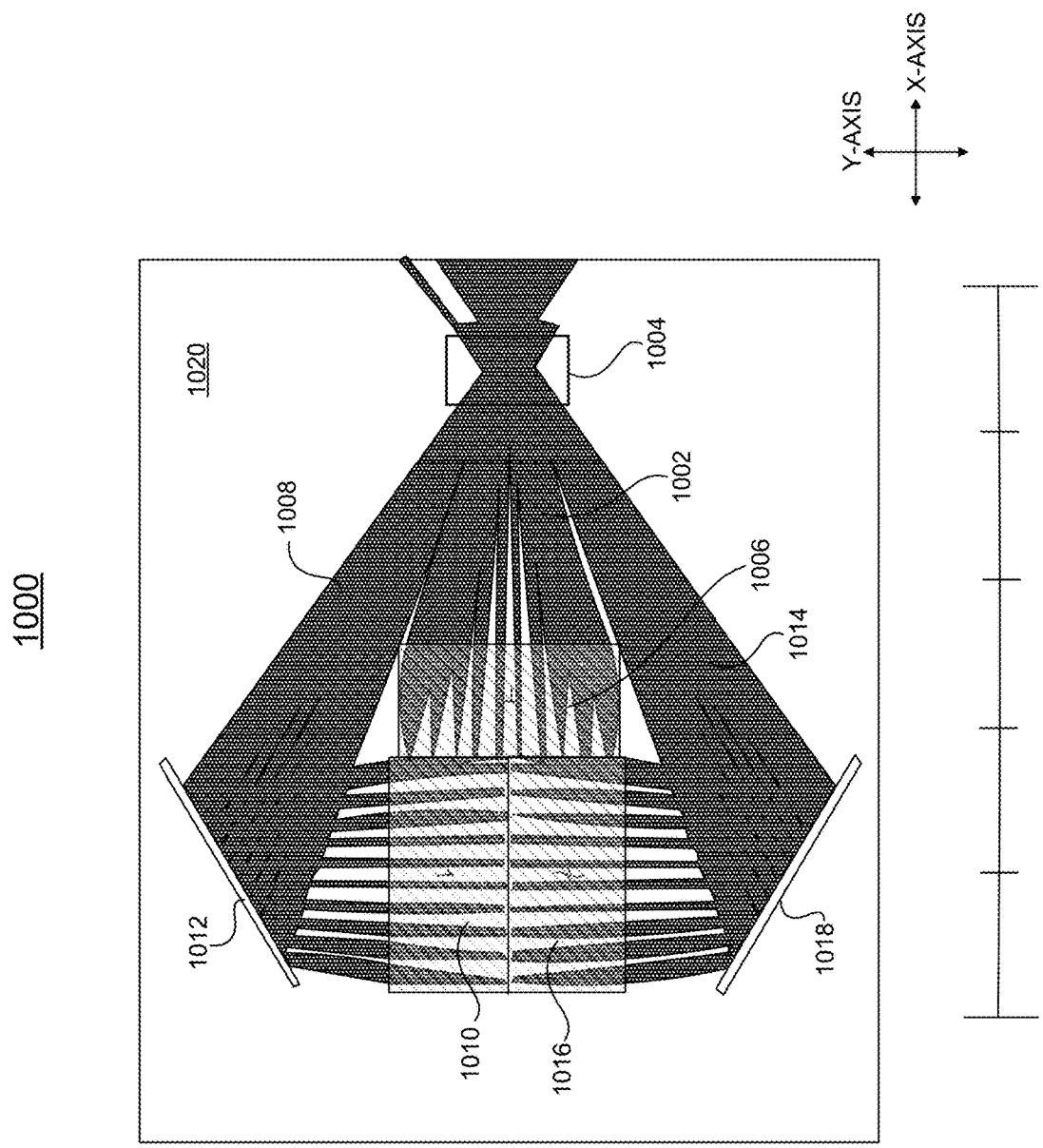
FIG. 10A illustrates a perspective view of light interactions with a waveguide system, in accordance with aspects of the disclosure

FIG. 10A illustrates a top view diagram of light interactions in a waveguide system 1000, in accordance with aspects of the disclosure. Waveguide system 1000 may be a similar or varied embodiment of waveguide system 900. Waveguide system 1000 shows various light paths in a waveguide 1020. Waveguide system 1000 shows light 1002 being directed towards and focused on an out-coupling diffraction grating 1004 from an in-coupling diffraction grating 1006 along a light path that may be similar to and a more detailed version of light path P1 (shown in FIG. 9B). Waveguide system 1000 shows light 1008 being directed towards and focused on out-coupling diffraction grating 1004 from an in-coupling diffraction grating 1010 and a reflective surface 1012. Light 1008 travels along a light path that may be similar to and a more detailed version of light path P2 (shown in FIG. 9C). Waveguide system 1000 shows light 1014 being directed towards and focused on out-coupling diffraction grating 1004 from an in-coupling diffraction grating 1016 and a reflective surface 1018. Light 1014 travels along a light path that may be similar to and a more detailed version of light path P3 (shown in FIG. 9C). An approximate distance from an edge of the in-coupling diffraction gratings to out-coupling diffraction grating 1004 may be 50 mm, according to an embodiment.

FIG. 10B illustrates a diagram 1050 representing spatial locations of eye reflections that are mapped to angles in a waveguide (e.g., waveguide 1020), in accordance with aspects of the disclosure. Light clusters 1052, 1054, and 1056 represent spatial locations of light that are received by multiple in-coupling diffraction gratings 1006, 1010, and 1016 and that are then redirected (in the waveguide) to out-coupling diffraction grating 1004. Light cluster 1052 may be representative of light that is received from one of multiple in-coupling diffraction gratings 1006, 1010, and 1016. Light cluster 1054 is representative of light that is received from another one of multiple in-coupling diffraction gratings 1006, 1010, and 1016. Light cluster 1056 is representative of light that is received from another one of multiple in-coupling diffraction gratings 1006, 1010, and 1016. The location, quantity, and pattern formed by light clusters 1052, 1054, and 1056 may change with changes to the orientation of the eye in the eyebox. In one embodiment, light clusters 1052, 1054, and 1056 are representative of light received from in-coupling diffraction gratings 1006, 1010, and 1016, respectively.

Diagram 1050 includes an x-axis angle and a y-axis angle of mapped light. The x-axis angle may represent the diffraction angle that an in-coupling diffraction grating diffracts incident light in the longitudinal x-axis direction of the waveguide. The y-axis angle may represent diffraction of incident light along the latitudinal y-axis (towards the center of the waveguide). The x-axis angle may also represent angles of incidence of light rays upon the out-coupling diffraction grating along the x-axis of the waveguide. The y-axis angle may also represent angles of incidence of light rays upon the out-coupling diffraction grating along the y-axis of the waveguide. Light clusters 1052, 1054, and 1056 show that in-coupling diffraction gratings encode (or map) a spatial position of eye reflections to a diffraction angle within the waveguide and show that the out-coupling grating decodes the positions as light that is directed to an image sensor. Light clusters 1052, 1054, and 1056 may represent clusters of pixels in an image sensor that respond to light from out-coupling diffraction grating. Diagram 1050 can be used to help decode the origin of a particular reflection of a light ray and may be considered a decoding map that may be used to reconstruct the images of the eyebox region. Additionally, since each of the in-coupling diffraction gratings may be illuminated from different particular portions of the eyebox, the disclosed techniques may use the light clusters to determine an orientation or position of an eye in the eyebox.

FIG. 11 illustrates a top view diagram of a waveguide system 1100 having multi-directional gratings, in accordance with aspects of the disclosure. The multi-directional gratings are configured to in-couple light reflections from an eyebox region and are oriented to direct the light towards different focal regions on an out-coupling diffraction grating using: various focal directions, various light paths, various focal lengths, and/or various focal points. Waveguide system 1100 includes similar features as and may operate similarly to waveguide system 900 (shown in FIGS. 9A-9C). Waveguide system 1100 is an embodiment of a multi-directional grating waveguide system that includes multiple lateral reflective surfaces on one side and includes an out-coupling diffraction grating that is positioned off-center of a waveguide. Waveguide system 1100 illustrates an example of an out-coupling diffraction grating having a significantly smaller footprint than the multiple in-coupling diffraction gratings.

Waveguide system 1100 includes a waveguide 1102, an out-coupling diffraction grating 1104, an in-coupling diffraction grating 1106, an in-coupling diffraction grating 1108, and an in-coupling diffraction grating 1110, according to an embodiment. The combination of the in-coupling diffraction gratings may have a footprint width W of 15 mm and a footprint length L of 23.5 mm. The out-coupling diffraction grating may have a footprint width WW of 1.5 mm and a footprint length LL of 3.8 mm. The out-coupling diffraction grating footprint may be, for example, less than 2% of the size of the footprint of the combination of the in-coupling diffraction gratings. Out-coupling diffraction grating 1104 may be off-set from the center line of waveguide 1102 to facilitate alignment with one or more lenses and/or images sensor carried by an HMD, for example.

Each of the in-coupling diffraction gratings 1106, 1108, and 1110 may be configured to direct light onto out-coupling diffraction grating 1104 at different focal points. For example, in-coupling diffraction grating 1106 may be configured to focus light (indicated by broken lines) onto focal point 1112 and generally onto focal region 1114. A focal position of in-coupling diffraction grating 1106 may include both focal point 1112 and focal region 1114.

In-coupling diffraction grating 1108 may be configured to focus light (indicated by broken lines) onto focal point 1116 and generally onto focal region 1118. In-coupling diffraction grating 1108 may be configured to initially direct light onto reflective surface 1109, and reflective surface 1109 may be positioned and oriented to redirect the light onto focal point 1116 and focal region 1118. Reflective surface 1109 may be a mirror that may be coated with a reflective material. Reflective surface 1109 may be a side surface of waveguide 1102. A focal position of in-coupling diffraction grating 1108 may include both focal point 1116 and focal region 1118.

In-coupling diffraction grating 1110 may be configured to focus light (indicated by broken lines) onto focal point 1112 and generally onto focal region 1120. In-coupling diffraction grating 1110 may be configured to initially direct light onto reflective surface 1111. Reflective surface 1111 may be configured and oriented to redirect the light onto a reflective surface 1113. Reflective surface 1113 may be configured and oriented to redirect the light onto focal point 1112 and onto focal region 1120. One, two, or more reflective surfaces may be used to direct light from in-coupling diffraction gratings onto one or more out-coupling diffraction gratings, according to various embodiment. A focal position of in-coupling diffraction grating 1110 may include both focal point 1112 and focal region 1120.

Inset 1122 highlights the general area of out-coupling diffraction grating 1104 and is shown in an expanded view for ease of illustration.

Figure 12:
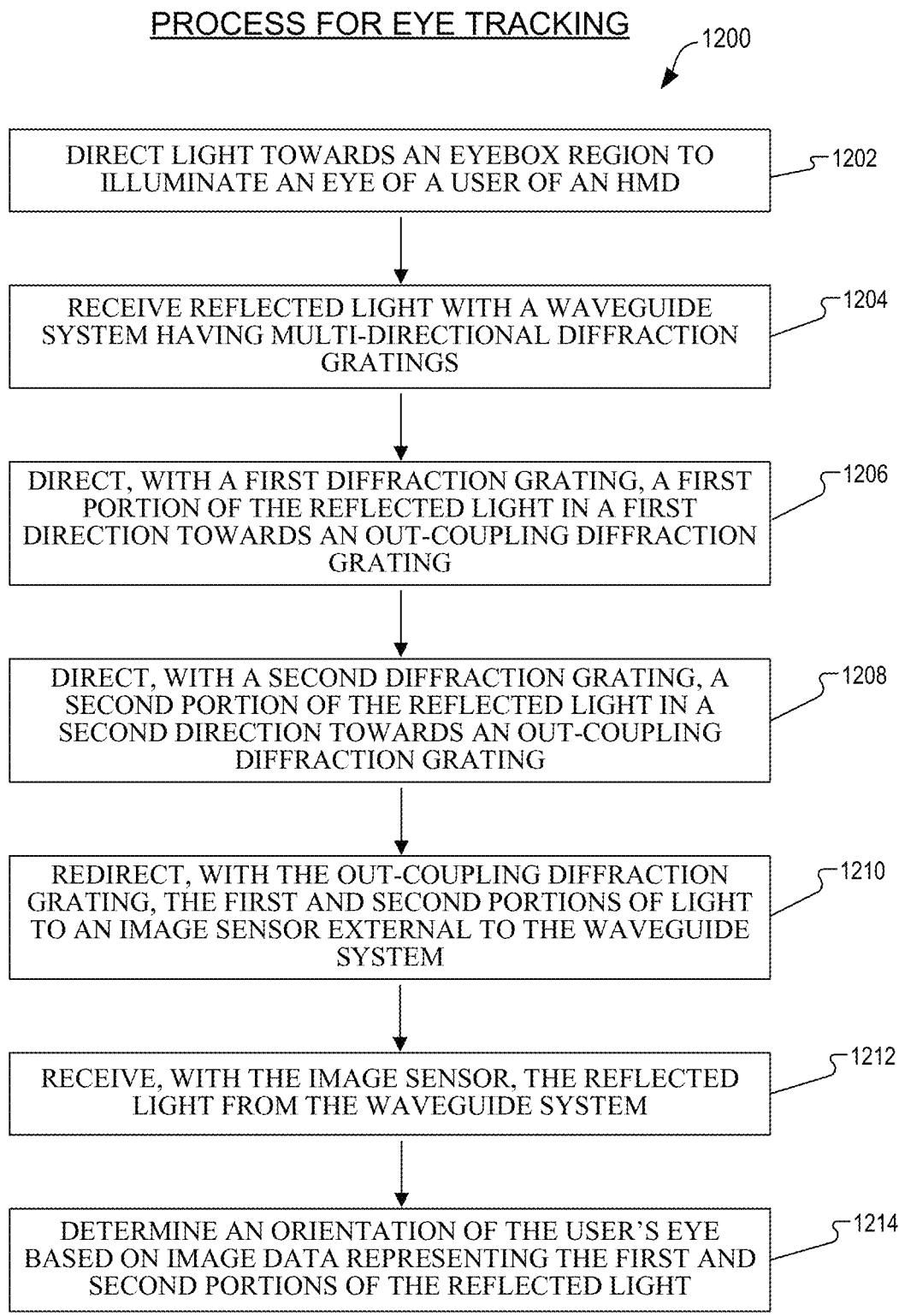
FIG. 12 illustrates a diagram of a process of eye tracking, in accordance with aspects of the disclosure.

FIG. 12 illustrates a process 1200 for eye tracking, according to an embodiment. Process 1200 may be at least partially incorporated into one or more HMDs (e.g., in controller 118) disclosed herein. The order in which some or all of the process blocks appear in process 1200 should not be deemed limiting. Rather, one of ordinary skill in the art having the benefit of the present disclosure will understand that some of the process blocks may be executed in a variety of orders not illustrated, or even in parallel.

At process block 1202, process 1200 directs light towards an eyebox region to illuminate an eye of a user of an HMD, according to an embodiment. Directing light towards eyebox region may include emitting infrared light towards eyebox region using two or more light sources (e.g., LEDs). Process block 1202 may proceed to process block 1204, according to an embodiment.

At process block 1204, process 1200 receives reflected light with a waveguide system having multi-directional diffraction gratings, according to an embodiment. The reflected light includes reflections of the light emitted towards the eyebox and reflected off of an eye. The waveguide system may include any of the waveguide systems disclosed herein. The waveguide system may be at least partially included in a lens assembly and may be at least partially positioned in a frame of an HMD. Process block 1204 may proceed to process block 1206, according to an embodiment.

At process block 1206, process 1200 directs, with a first diffraction grating, a first portion of the reflected light in a first direction towards an out-coupling diffraction grating, according to an embodiment. Process block 1206 may proceed to process block 1208, according to an embodiment.

At process block 1208, process 1200 directs, with a second diffraction grating, a second portion of the reflected light in a second direction towards an out-coupling diffraction grating, according to an embodiment. The second direction may have an angular offset from the first direction of, for example, 30°, 45°, 90°, 120°, or the like. Process block 1208 may proceed to process block 1210, according to an embodiment.

At process block 1210, process 1200 redirects, with the out-coupling diffraction grating, the first and second portions of light to an image sensor external to the waveguide system, according to an embodiment. Process block 1210 may proceed to process block 1212, according to an embodiment.

At process block 1212, process 1200 receives, with the image sensor, the reflected light from the waveguide system, according to an embodiment. The image sensor may convert the reflected light from optical to electrical signals and save or provide the electrical signals to a controller as image data. Process block 1212 proceeds to process block 1214, according to an embodiment.

At process block 1212, process 1200 determines an orientation of the user's eye based on image data representing the first and second portions of the reflected light, according to an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (IMD) connected to a host computer system, a standalone AMD, a mobile device or computing system, or any other hardware platform capable of providing artificial reality content to one or more viewers.

The term "processing logic" (e.g., controller 118, processing logic 120) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., memories 122) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens assembly comprising:
   a waveguide;
   an out-coupling diffraction grating disposed in the waveguide and configured to out-couple light from the waveguide;
   a first in-coupling diffraction grating disposed in the waveguide, wherein the first in-coupling diffraction grating is configured to in-couple the light and is oriented to direct the light in a first direction towards the out-coupling diffraction grating; and
   a second in-coupling diffraction grating disposed in the waveguide, wherein the second in-coupling diffraction grating is configured to in-couple the light and is oriented to direct the light in a second direction towards the out-coupling diffraction grating, wherein the first direction and second direction are approximately perpendicular to each other.

2. The lens assembly of claim 1, wherein the first in-coupling diffraction grating has a first focal length and the second in-coupling diffraction grating has a second focal length that is greater than the first focal length.

3. The lens assembly of claim 1 further comprising:
   a third in-coupling diffraction grating disposed in the waveguide, wherein the third in-coupling diffraction grating is configured to in-couple the light and is oriented to direct the light in a third direction towards the out-coupling diffraction grating.

4. The lens assembly of claim 3, wherein the first, second, and third in-coupling diffraction gratings are configured to direct the light onto respective first, second, and third focal regions of the out-coupling diffraction grating.

5. The lens assembly of claim 3, wherein the first, second, and third in-coupling diffraction gratings are configured to direct the light towards respective first, second, and third focal points on the out-coupling diffraction grating.

6. The lens assembly of claim 3, wherein the second and third in-coupling diffraction gratings are configured to direct light to reflect off of at least one side surface of the waveguide to redirect the light to the out-coupling diffraction grating.

7. The lens assembly of claim 3, wherein the first, second, and third in-coupling diffraction gratings are disposed on a first end of the waveguide and the out-coupling diffraction grating is disposed on a second end of the waveguide.

8. The lens assembly of claim 1, wherein the first in-coupling diffraction grating is configured to reflect the light between a top and bottom surface of the waveguide to direct the light to the out-coupling diffraction grating.

9. The lens assembly of claim 1 further comprising:
   one or more mirrors, wherein the second in-coupling diffraction grating is configured to direct the light to the out-coupling diffraction grating using the one or more mirrors.

10. The lens assembly of claim 1, wherein at least one of the first in-coupling diffraction grating or the second in-coupling diffraction grating diffractively operate in reflection.

11. The lens assembly of claim 1, wherein first and second diffraction gratings are volume Bragg gratings.

12. A head mounted device comprising:
    a frame;
    a lens assembly coupled to the frame and configured to transmit scene light to an eyebox region;
    a waveguide system coupled to the lens assembly and to the frame, wherein the waveguide system includes:
    a waveguide;
    an out-coupling diffraction grating disposed in the waveguide and configured to out-couple reflected light from the waveguide;
    a first in-coupling diffraction grating disposed in the waveguide, wherein the first in-coupling diffraction grating is configured to in-couple and is oriented to direct the reflected light in a first direction towards the out-coupling diffraction grating; and a second in-coupling diffraction grating disposed in the waveguide, wherein the second in-coupling diffraction grating is configured to in-couple the reflected light and is oriented to direct the reflected light in a second direction towards the out-coupling diffraction grating, wherein the first direction and second direction are approximately perpendicular to each other.

13. The head mounted device of claim 12, wherein the first in-coupling diffraction grating has a first focal length and the second in-coupling diffraction grating has a second focal length that is greater than the first focal length.

14. The head mounted device of claim 12, wherein the first and second in-coupling diffraction gratings are configured to direct the light onto respective first and second focal regions of the out-coupling diffraction grating.

15. A lens assembly comprising:
a waveguide;
an out-coupling diffraction grating disposed in the waveguide and configured to out-couple light from the waveguide;
a first in-coupling diffraction grating disposed in the waveguide, wherein the first in-coupling diffraction grating is configured to in-couple the light and is oriented to direct the light in a first direction towards a first focal region of the out-coupling diffraction grating; and
a second in-coupling diffraction grating disposed in the waveguide, wherein the second in-coupling diffraction grating is configured to in-couple the light and is oriented to direct the light in a second direction towards a second focal region of the out-coupling diffraction grating that is adjacent to the first focal region of the out-coupling diffraction grating.

16. The lens assembly of claim 15, wherein the light received by the first in-coupling diffraction grating is from a first portion of an eyebox region, and wherein the light received by the second in-coupling diffraction grating is from a second portion of the eyebox region that is different from the first portion of the eyebox region.

17. The lens assembly of claim 15 further comprising:
a mirror, wherein the second in-coupling diffraction grating is configured to direct the light in the second direction to the second focal region of the out-coupling diffraction grating using the mirror, and wherein the first in-coupling diffraction grating is configured to direct the light in the first direction to the first focal region of the out-coupling diffraction grating without using the mirror.

18. The lens assembly of claim 15 further comprising:
a third in-coupling diffraction grating disposed in the waveguide, wherein the third in-coupling diffraction grating is configured to in-couple the light and is oriented to direct the light in a third direction towards a third focal region of the out-coupling diffraction grating that is adjacent to the first focal region.

19. The lens assembly of claim 18, wherein the first direction is substantially perpendicular to the second direction and the third direction, and wherein the second direction is substantially opposite the third direction.

* * * * *